United States Patent
Davis et al.

(10) Patent No.: US 11,775,910 B2
(45) Date of Patent: Oct. 3, 2023

(54) APPLIED COMPUTER TECHNOLOGY FOR HIGH EFFICIENCY VALUE STREAM MANAGEMENT AND MAPPING AND PROCESS TRACKING

(71) Applicant: Copado, Inc., Chicago, IL (US)

(72) Inventors: Andrew Davis, San Diego, CA (US); Gloria Ramchandani, Alpharetta, GA (US); Mert Yalti, Madrid (ES); Ümit Can Uçkan, Madrid (ES); Mario González Duarte, Madrid (ES)

(73) Assignee: Copado, Inc., Chicago, IL (US)

( * ) Notice: Subject to any disclaimer, the term of this patent is extended or adjusted under 35 U.S.C. 154(b) by 0 days.

(21) Appl. No.: 17/376,782

(22) Filed: Jul. 15, 2021

(65) Prior Publication Data

US 2022/0019955 A1     Jan. 20, 2022

Related U.S. Application Data

(60) Provisional application No. 63/052,177, filed on Jul. 15, 2020.

(51) Int. Cl.
    *G06Q 10/0639*      (2023.01)
    *G06Q 10/0633*      (2023.01)

(52) U.S. Cl.
    CPC ..... *G06Q 10/06393* (2013.01); *G06Q 10/0633* (2013.01)

(58) Field of Classification Search
    CPC .............. G06Q 10/06393; G06Q 10/0633
    See application file for complete search history.

(56) References Cited

U.S. PATENT DOCUMENTS 6,400,366 B1    6/2002   Davies et al.
6,995,768 B2    2/2006   Jou et al.
(Continued)

FOREIGN PATENT DOCUMENTS

| CN | 109087004 B | * | 4/2021 | ......... G06Q 10/0633 |
| WO | 2014138271 A2 | | 9/2014 | |
| WO | 2018006097 A1 | | 1/2018 | |

OTHER PUBLICATIONS

Nightingale "Enterprise Strategic Analysis" (2008) (https://dspace.mit.edu/bitstream/handle/1721.1/81907/ESAT_2.0.pdf?sequence=1)(Year: 2008).*

(Continued)

*Primary Examiner* — Sujay Koneru
(74) *Attorney, Agent, or Firm* — Thompson Coburn LLP; Benjamin L. Volk, Jr.

(57) ABSTRACT

Methods, non-transitory computer readable media, and computing devices are disclosed that obtains and stores a mapping of status values to process-blocks within stages associated with a linear process performed on an enterprise application network. A work item status in change records of the database is correlated with the status values based on the mapping to identify one of the stages for work items. Event records are then generated based on the correlation, activity records of the database, and another correlation of a unique identifier of one of the work items in each of the change and activity records. A generated value stream map (VSM) is then output for display that comprises a graphical timeline of activity associated with the linear process and metrics generated based on the event records and comprising real-time metrics for the process-blocks or stages and aggregate metrics for the linear process.

24 Claims, 18 Drawing Sheets

(56) References Cited

U.S. PATENT DOCUMENTS

| | | | |
|---|---|---|---|
| 8,321,806 B2 | 11/2012 | Agrusa et al. | |
| 8,363,048 B2 | 1/2013 | Gering | |
| RE44,188 E | 4/2013 | Adra | |
| 8,669,994 B2 | 3/2014 | Cardno et al. | |
| 9,459,839 B2 | 10/2016 | Kisynski et al. | |
| 10,026,045 B1 | 7/2018 | Portnoy et al. | |
| 10,819,593 B1 | 10/2020 | Parthasarathy et al. | |
| 2002/0091990 A1 | 7/2002 | Little et al. | |
| 2004/0039625 A1 | 2/2004 | Malnack et al. | |
| 2004/0162745 A1* | 8/2004 | Rodrigue | G06Q 10/06395 705/7.41 |
| 2005/0234766 A1* | 10/2005 | Shuker | G06Q 30/06 705/1.1 |
| 2006/0080157 A1* | 4/2006 | Shuker | G06Q 10/06312 705/7.22 |
| 2006/0085237 A1 | 4/2006 | Shuker et al. | |
| 2006/0242005 A1* | 10/2006 | Rodrigue | G06Q 10/0633 705/7.42 |
| 2007/0078531 A1* | 4/2007 | Adra | G06Q 10/00 700/36 |
| 2007/0203768 A1* | 8/2007 | Adra | G08B 13/14 340/572.1 |
| 2008/0095433 A1 | 4/2008 | Johnson et al. | |
| 2008/0195433 A1 | 8/2008 | Glenn et al. | |
| 2009/0031598 A1* | 2/2009 | Soni | G06Q 50/04 40/600 |
| 2011/0320228 A1* | 12/2011 | Kowalski | G06Q 10/063 705/7.11 |
| 2012/0215829 A1 | 8/2012 | Naphade et al. | |
| 2012/0331439 A1 | 12/2012 | Zimmermann et al. | |
| 2013/0018696 A1* | 1/2013 | Meldrum | G06Q 10/06315 705/348 |
| 2013/0311968 A1 | 11/2013 | Sharma | |
| 2014/0101091 A1 | 4/2014 | Brown et al. | |
| 2014/0365266 A1* | 12/2014 | Sethi | G06Q 10/0633 705/7.27 |
| 2015/0134796 A1* | 5/2015 | Theimer | G06F 16/258 709/223 |
| 2015/0195404 A1* | 7/2015 | O'Connor | H04M 3/5175 379/265.03 |
| 2018/0096372 A1* | 4/2018 | Rickard, Jr. | G06N 5/003 |
| 2018/0374051 A1* | 12/2018 | Li | G06Q 10/0633 |
| 2019/0026663 A1* | 1/2019 | Homeyer | G06Q 10/0633 |
| 2020/0133814 A1* | 4/2020 | Prabath | G06F 16/21 |
| 2020/0334269 A1 | 10/2020 | Chowdhury et al. | |
| 2021/0149771 A1* | 5/2021 | Wilcock | G06F 11/1469 |

OTHER PUBLICATIONS

Goff, "What is Software Usage Analytics?", Revenera, Sep. 12, 2019, entire document, retrieved form the internet on Sep. 20, 2021, https://www.revenera.com/blog/software-monetization/what-is-software-usage-analytics/.

International Search Report and Written Opinion for PCT/US2021/041821 dated Oct. 21, 2021.

Joshi, "Automating Value Stream Mapping in Lean Environment by Using RFID Tool", International Journal of Applied Research & Studies, Nov. 2012, entire document, retrieved on Sep. 27, 2021, https://www.hgsitabuilder.com/files/writeable/uploads/hostgator427959/file/ijars181.pdf.

Mtz, "Process Analysis, Programming, and Software Development", Sourcecodematrix, Jan. 23, 2013, entire document, retrieved form the internet on Sep. 20, 2021, https://sourcecodematrix.wordpress.com/2013/01/23/process-analysis-programming-and-software-development/.

Ml 1 1 AL et al., "Process Mining Software Repositories from Student Projects in an Undergraduate Software Engineering Course", ICSE Companion 2014: Companion Proceedings of the 36th International Conference on Software Engineering, May 2014, pp. 344-353.

Stroulia et al., "Interactive Exploration of Collaborative Software-Development Data", 2013 IEEE International Conference on Software Maintenance, Sep. 22-28, 2013, pp. 504-507.

* cited by examiner

| Event Id | Work Item | Operator | Start Date | End Date | Elapsed | Lead | Status | Stage | Type | Process | Re-Entry | Event Code |
|---|---|---|---|---|---|---|---|---|---|---|---|---|
| 3000 | WorkItem1 | Worker1 | 2021-06-07 | | | | Processing | Stage1 | Waiting | | 0 | Stage1-Waiting-WorkItem1-0 |
| 3001 | WorkItem2 | | 2021-06-07 | 2021-06-14 | 172.98 | 172.98 | Qualification | Stage1 | Active | Process1 | 0 | Process1-Active-WorkItem2-0 |
| 3002 | WorkItem3 | | 2021-06-14 | 2021-06-14 | 0.03 | 0.03 | Needs | Stage2 | Waiting | | 0 | Stage2-Waiting-WorkItem3-0 |

APPLIED COMPUTER TECHNOLOGY FOR HIGH EFFICIENCY VALUE STREAM MANAGEMENT AND MAPPING AND PROCESS TRACKING

This application claims the benefit of U.S. Provisional Patent Application Ser. No. 63/052,177, filed Jul. 15, 2020, which is hereby incorporated by reference in its entirety.

FIELD

This technology generally relates to automated process monitoring and analytics and, more specifically, to applied computer technology for high efficiency value stream management and mapping, and process tracking.

BACKGROUND

Complex business processes such as software development often require multiple sub-processes performed by different people over a period of hours, days, or weeks. There are often enormous inefficiencies in these processes, with work waiting in queues between sub-processes, work performed in earlier stages not meeting the requirements for later stages, and excessive load causing work to take longer than necessary. These inefficiencies impede business effectiveness, causing additional delays and costs. These work items are usually tracked in a database which may record changes to the state of work items, but which does not provide a way to gather summary metrics across all of the work items.

To clearly understand and address these inefficiencies, teams need a way to visualize the sequence of sub-processes, and to track metrics like duration, quality, completion rates, and load on each sub-process. To accomplish this, businesses need a way to model the sequence of sub-processes involved in their business processes and to calculate metrics about work progress based on that model. Gathering such metrics on process and sub-processes currently require estimates and approximations based on a small sampling of data captured at a particular moment in time because the data required for each sub-process often resides in different systems, is not monitored in real time, and is stored in ways that make it impossible for humans to analyze them accurately.

For example, most systems either do not track change information, or track it as a series of many updates distributed across thousands or millions of records. Those change records include many types of changes, most of which are irrelevant to calculating the metrics of interest. Accordingly, identifying areas of improvement is imprecise, and not updated in real time with manual approaches to value stream mapping, which fail to effectively track and analyze processes over time to facilitate performance optimizations.

SUMMARY

A method for value stream mapping and management of processes automatically tracked in computer systems is disclosed. The method is implemented by one or more computing devices and comprises obtaining and storing a mapping of status values to process-blocks within stages associated with a linear process performed on an enterprise application network. The process-blocks each correspond with one of a plurality of sub-processes of the linear process. A work item status in change records of the database is correlated with the status values based on the mapping to identify one of the stages for each of a plurality of work items. The change records further comprise a timestamp. Event records are generated based on the correlation, activity records of the database, and another correlation of a unique identifier of one of the work items in each of the change and activity records. Each of the activity records comprises a start time and a duration of one of the sub-processes, a type of activity, and a result of the activity. A generated value stream map (VSM) is then output for display. The VSM comprises a graphical timeline of activity associated with the linear process and metrics generated based on the event records and comprising real-time metrics for the process-blocks or stages and aggregate metrics for the linear process.

A non-transitory computer readable medium is disclosed that has stored thereon instructions for value stream mapping and management of processes automatically tracked in computer systems and comprises executable code that, when executed by one or more processors, causes the processors to obtain and store a mapping of status values to process-blocks within stages associated with a linear process performed on an enterprise application network. The process-blocks each correspond with one of a plurality of sub-processes of the linear process. A work item status in change records of the database is correlated with the status values based on the mapping to identify one of the stages for each of a plurality of work items. The change records further comprise a timestamp. Event records are generated based on the correlation, activity records of the database, and another correlation of a unique identifier of one of the work items in each of the change and activity records. Each of the activity records comprises a start time and a duration of one of the sub-processes, a type of activity, and a result of the activity. A generated value stream map (VSM) is then output for display. The VSM comprises a graphical timeline of activity associated with the linear process and metrics generated based on the event records and comprising real-time metrics for the process-blocks or stages and aggregate metrics for the linear process.

A computing device also is disclosed that comprises memory comprising programmed instructions stored thereon and one or more processors configured to execute the stored programmed instructions to obtain and store a mapping of status values to process-blocks within stages associated with a linear process performed on an enterprise application network. The process-blocks each correspond with one of a plurality of sub-processes of the linear process. A work item status in change records of the database is correlated with the status values based on the mapping to identify one of the stages for each of a plurality of work items. The change records further comprise a timestamp. Event records are generated based on the correlation, activity records of the database, and another correlation of a unique identifier of one of the work items in each of the change and activity records. Each of the activity records comprises a start time and a duration of one of the sub-processes, a type of activity, and a result of the activity. A generated value stream map (VSM) is then output for display. The VSM comprises a graphical timeline of activity associated with the linear process and metrics generated based on the event records and comprising real-time metrics for the process-blocks or stages and aggregate metrics for the linear process.

The methods, non-transitory computer readable media, and computing devices of the technology disclosed herein efficiently generate VSMs that facilitate more effective analysis of tracked processes represented by the VSMs. With this technology, log data generated by enterprise application platform (e.g., Salesforce™) processes (e.g., software development) can be efficiently processed and analyzed using particular database table and other types of manipulations to generate useful metrics and for the tracked processes. This technology leverages a mapping of statuses to process-blocks within stages of tracked processes, along with correlations to log data representing events and activity associated with the processes, to generate relatively rich VSMs that more effectively illuminate areas of improvement and optimizations for the processes.

The technology disclosed herein includes creating a customizable software application that can convert a sequence of changes to database records into a VSM visualization. This VSM application allows users to model a business process, and then use that model to convert a sequence of changes to database records into metrics. The VSM application provides a "drag and drop" user interface for easily defining the processes and sub-processes and correlating those to states of a work items in a database. Users can define custom metrics which should be tracked within the processes and sub-processes. Once configured and activated, the VSM application can deliver historical and real-time metrics on how long it takes to complete work (i.e., duration), how long work waits, the quality of work, and how many work items have been completed over a historical period of time, for example, while facilitate collaborative discussion and filtering to analyze subsets of data.

Thus, as a technical innovation, techniques are described and illustrated herein that practically apply computer technology in new and meaningful ways that are able to find the "signal" within the "noise" through exposing hidden database change records, processing very large numbers (e.g., millions) of these records, filtering only relevant items, correlating the relevant items to a model of a work process, and using that model to create a coherent picture of the progress of work associated with the work process.

BRIEF DESCRIPTION OF THE DRAWINGS

FIG. 11 is a screenshot of exemplary event records;

FIG. 13 is a screenshot of exemplary value stream management metrics details;

DETAILED DESCRIPTION

Figure 1:
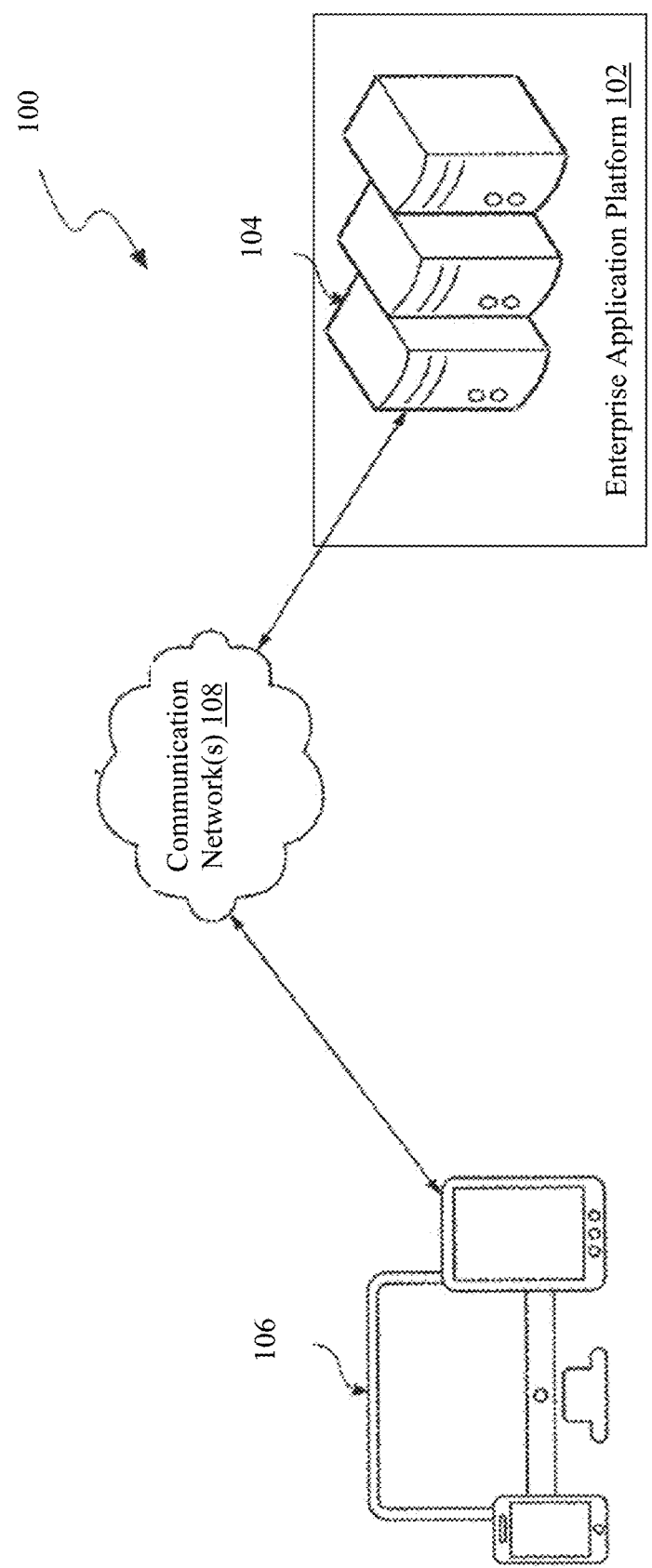
FIG. 1 is a block diagram of an exemplary network environment that includes an enterprise application platform with application servers.

Enterprise application platforms, such as the Salesforce™ platform, enable developers to create add-on applications that are built on the underlying functionality of the platform. For example, the Salesforce™ platform includes services that are accessible to developers to facilitate development and deployment of add-on applications and websites that are hosted on the Salesforce™ platform and available for use by end users. Enterprise application platforms, including the Salesforce™ platform, can facilitate the generation of logs that are accumulated over time and maintain data associated with processes that are performed on the platform. Some examples of linear processes facilitated by enterprise application platforms are software development, customer support, and sales processes, although the technology described and illustrated herein can leverage other types of processes that may be managed via enterprise application(s).

This technology relates to a system (e.g., in the form of an add-on application that can be hosted on an enterprise application platform) for transforming a time series of log data, generated based on user interactions with an enterprise application as part of a work process, into statistical summaries of the progress of individual work items associated with the work process. The transformation is based on specification of the work being tracked and results in the creation of a visual model of the work process, which is referred to herein as a value stream map (VSM).

This VSM defines the way the log data is filtered and summarized, which is relatively efficient with this technology, and advantageously provides an improved user interface environment that presents the results of an analysis of the log data in a more effective manner so that trends can be tracked and areas for improvement can be identified. In some examples, the statistical summaries, or other statistical or analytical information, is displayed as an overlay on the VSM to allow for more efficient and effective value stream management, tracking process data over time, and optimizing performance of the associated work process.

Accordingly, the VSM of this technology includes a graphical representation of the stages by which work associated with a work process is performed and the metrics associated with that work process. Any type of work can be tracked with this technology, as long as the overall associated work process can be represented by a linear system of serial or parallel steps, and changes to the status of work can be tracked in a linear time series (e.g., via log data as explained in more detail below).

The main body of the VSM is composed of a series of stages, each of which has one or more parallel processes. Each of the process-blocks includes metrics indicating the amount of processing and waiting time associated with that process, the number of work items and workers currently active in that process, and the percentage of work leaving that process that is both complete and accurate. The VSM also includes metrics summarizing the amount of time and the percentage of work that moves through the entire business process without being sent back due to quality issues. An exemplary environment for, and an exemplary operation of, this technology will now be described in more detail with reference to FIGS. 1-18.

Referring more specifically to FIG. 1, a block diagram of an exemplary network environment 100 that includes an enterprise application platform 102 with application servers 104 is illustrated. The application servers 104 in this example are coupled to client devices 106 via communication network(s), although the application servers 104 and client devices 106 can be coupled together via other topologies. The network environment 100 also may include other network devices, such as one or more routers or switches, for example, which are known in the art and thus will not be described herein.

In the example network environment 100, service providers can use the enterprise application platform 102 (e.g., the Salesforce™ platform) to provide add-on applications that the client devices 106 can access via the communication network(s) 108. The communication network(s) 108 may include any combination of private, public, wired, or wireless networks. Data communicated over the communication network(s) 108 may be encrypted or unencrypted at various locations or along different portions of the communication network(s) 108. Accordingly, each component depicted in the example network environment 100 may include combinations of hardware and/or software to process data, perform functions, communicate over the communication network(s) 108, and the like.

The enterprise application platform 102 can provide access to a shared pool of configurable computing resources, including servers, storage, applications, a software platform, networks, services, and the like, accessed by service provider servers or other devices (not shown) to offer add-on applications to the client devices 106. The enterprise application platform 102 in this example supports multiple tenants and may be referred to as a platform as a service (PaaS). The enterprise application platform 102 can be accessible to developers for creating the add-on applications that run on the components of the enterprise application platform 102. Developers can include third-party developers that do not own, operate, provide, or otherwise manage the enterprise application platform 102.

For example, the Salesforce™ platform includes a PaaS called Force.com that is accessible to developers to simplify the development and deployment of add-on applications and websites that are hosted on the Salesforce™ platform and available for use by end users of the client devices 106. Such add-on applications can provide services, such as those described and illustrated by way of the examples herein, that are provided by the application servers 104 and are built on the underlying functionality of the enterprise application platform 102. The application servers 104 also may provide or administer a user interface (e.g., website) accessible from the client devices 106 that may include features such as dashboard analytics.

The add-on applications provided by application servers 104 are built using one or more programming languages that are particular to the enterprise application platform 102. For example, Force.com™ applications are typically built using Apex™ (a proprietary programming language for Force.com™ that is similar to Java™) and Visualforce™ (a proprietary framework for Force.com™ for developing customized user interfaces). The code used to build add-on applications may include functions that are accessible by the add-on applications. While the Salesforce™ platform is used in the examples described and illustrated herein, other enterprise application platforms, programming languages, and user interface software can also be used with this technology.

Figure 2:
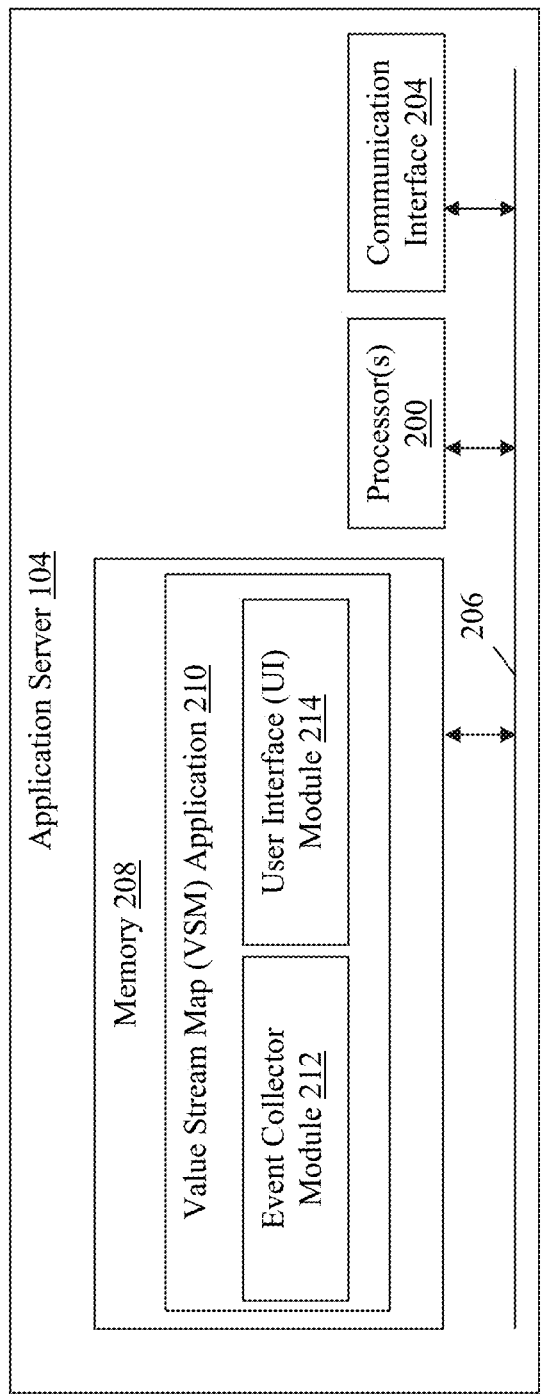
FIG. 2 is a block diagram of an application server hosting a value stream map (VSM) application that facilitates management of tracked processes.

Referring to FIGS. 1-2, the application servers 104 may perform any number of functions, including hosting applications, providing network security, and/or access control, for example. An exemplary one of the application servers 104 is illustrated in FIG. 2. In this example, the application server 104 includes processor(s) 200, memory 202, and a communication interface 204, which are coupled together by a bus 206, although the application server 104 can include other types or numbers of elements in other configurations.

The processor(s) 200 of the application server 104 may execute programmed instructions stored in the memory 208 of the application server 104 for any number of the functions identified above and described and illustrated in more detail below. The processor(s) 200 of the application server 104 may include one or more central processing units (CPUs) or general purpose processors with one or more processing cores, for example, although other types of processor(s) can also be used.

The memory 208 of the application server 104 stores these programmed instructions for one or more aspects of the present technology as described and illustrated herein, although some or all of the programmed instructions could be stored elsewhere. A variety of different types of memory storage devices, such as random access memory (RAM), solid state drives, flash memory, or other computer readable medium which is read from and written to by a magnetic, optical, or other reading and writing system that is coupled to the processor(s) 200, can be used for the memory 208.

Accordingly, the memory 208 of the application server 104 can store one or more modules that can include computer executable instructions that, when executed by the application server 104, cause the application server 104 to perform actions, such as to transmit, receive, or otherwise process network messages, for example, and to perform other actions described and illustrated below with reference to FIGS. 3-18. The modules can be implemented as components of other modules, application, or add-on applications, for example.

Additionally, the modules may be operative in a cloud-based computing environment. The modules can be executed within or as virtual machine(s) or virtual server(s) that may be managed in a cloud-based computing environment (e.g., enterprise application platform 102). Also, the modules, and even the application server 104 itself, may be located in virtual server(s) running in a cloud-based computing environment rather than being tied to one or more specific physical network computing devices. Also, the modules may be running in one or more virtual machines (VMs) executing on the application server 104 managed or supervised by a hypervisor.

In this particular example, the memory 208 of the application server 104 includes a VSM application 210 that includes an event collector module 212 and a UI module 214, although other modules can be contained within the memory 208 in other examples. The VSM application in this example is configured (e.g., via one of the client devices 106) to collect and analyze certain data to facilitate generation of VSMs. In particular, the client devices 106 can obtain the VSM application as an add-on application within the enterprise application platform 102 and configure the particular metadata objects that represent work items, which fields on those metadata objects represent status fields for the work items, along with additional fields to aggregate and display within the VSM.

In some examples, database tables on the Salesforce® platform are used to represent work items such as cases, opportunities, or user stories, for example, with each record in the tables representing one work item, although other types of work items and/or data stores can also be used. The event collector module 212 is configured to obtain the particular historical data associated with the work items via logs maintained by the enterprise application platform 102 in some examples. After transforming and analyzing the data based on a stored configuration by the VSM application 210, the UI module 214 presents a VSM representing a lifecycle of the work items in the form of a value stream that also includes additional associated metrics regarding a linear process performed on the enterprise application platform 102 and associated with the work items.

More specifically, in some examples a linear sequence of changes to a state field is extracted and transformed on a database record (stored in a field history tracking table associated with a metadata object in a multi-tenant database) to reconstruct a timeline of changes to the work item represented by that record. Metrics such as the amount of time a work item spent in a particular process and the number of times it was returned to that process for re-work are calculated based on the transformed historical log data. The metrics associated with multiple records are aggregated and data about the typical amount of time each work item spends in different stages, and the level of quality at each stage, for example, is displayed in the VSM generated by the UI module 214. The operation of the VSM application 210 is described and illustrated in more detail below with reference to FIGS. 3-18.

Referring back to FIGS. 1-2, the communication interface 204 of the application server 104 operatively couples and communicates between the application server 104 and the client devices 106 that are coupled to the communication network(s) 108, although other types or numbers of communication networks or systems with other types or numbers of connections or configurations to other devices or elements can also be used. By way of example only, the communication network(s) can include local area network(s) (LAN(s)) or wide area network(s) (WAN(s)), and can use TCP/IP over Ethernet and industry-standard protocols, although other types or numbers of protocols or communication networks can be used. The communication network(s) in this example can employ any suitable interface mechanisms and network communication technologies including, for example, Ethernet-based Packet Data Networks (PDNs).

While the application server 104 is illustrated in this example as including a single device, the application server 104 in other examples can include a plurality of devices each having processor(s) (each processor with processing core(s)) that implement one or more steps of this technology. In these examples, one or more of the devices can have a dedicated communication interface or memory. Alternatively, one or more of the devices can utilize the memory, communication interface, or other hardware or software components of one or more other devices included in the application server 104.

Additionally, one or more of the devices that together comprise the application server 104 in other examples can be standalone devices or integrated with one or more other devices or apparatuses. Moreover, one or more of the devices of the application server 104 in these examples can be in a same or a different communication network including one or more public, private, or cloud networks, for example.

The client devices 106 of the network environment 100 in this example include any type of computing device that can exchange network data, such as mobile, desktop, laptop, Internet of Things (IOT), or tablet computing devices, virtual machines (including cloud-based computers), or the like. Each of the client devices 106 in this example includes a processor, a memory, and a communication interface, which are coupled together by a bus or other communication link (not illustrated), although other numbers or types of components could also be used.

The client devices 106 may run interface applications, such as standard web browsers or standalone client applications, which may provide an interface to make requests for, and receive content stored on, one or more of the application server 104 via the communication network(s) 108. The client devices 106 may further include a display device, such as a display screen or touchscreen, or an input device, such as a keyboard for example (not illustrated).

Although the exemplary network environment with the network application servers 104, client devices 106, and communication network(s) 108 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

The examples may also be embodied as one or more non-transitory computer readable media having instructions stored thereon, such as in the memory 208 of the application server 104, for one or more aspects of the present technology, as described and illustrated by way of the examples herein. The instructions in some examples include executable code that, when executed by one or more processors, such as the processor(s) 200 of the application server 104, cause the processors to carry out steps necessary to implement the methods of the examples of this technology that are described and illustrated herein.

Figure 3:
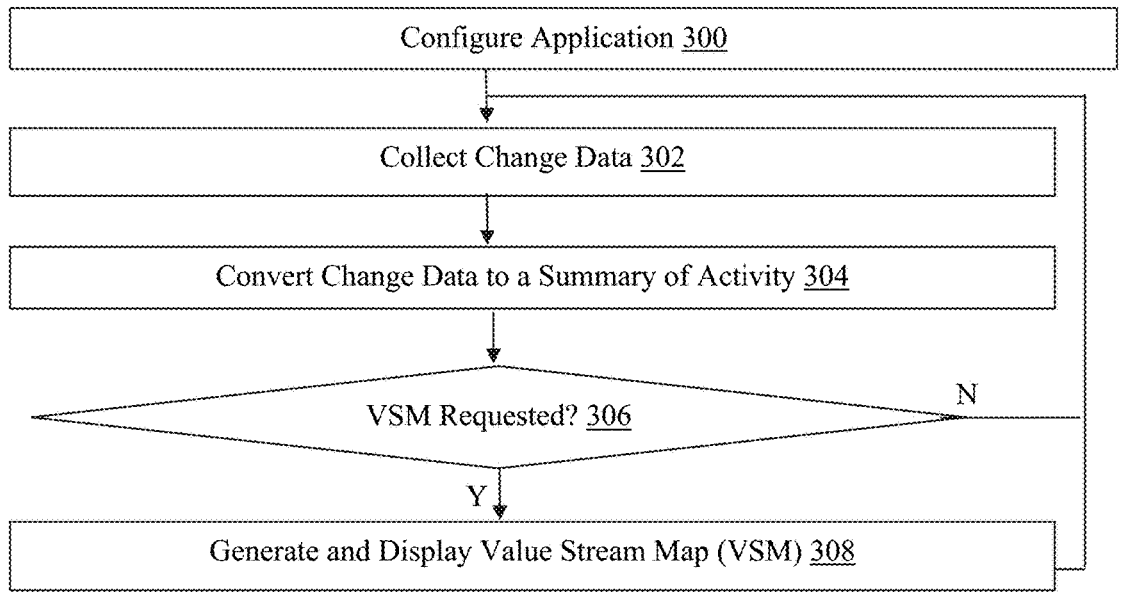
FIG. 3 is a flowchart of an exemplary method for value stream mapping and management of processes tracked in computer systems.
Figure 4:
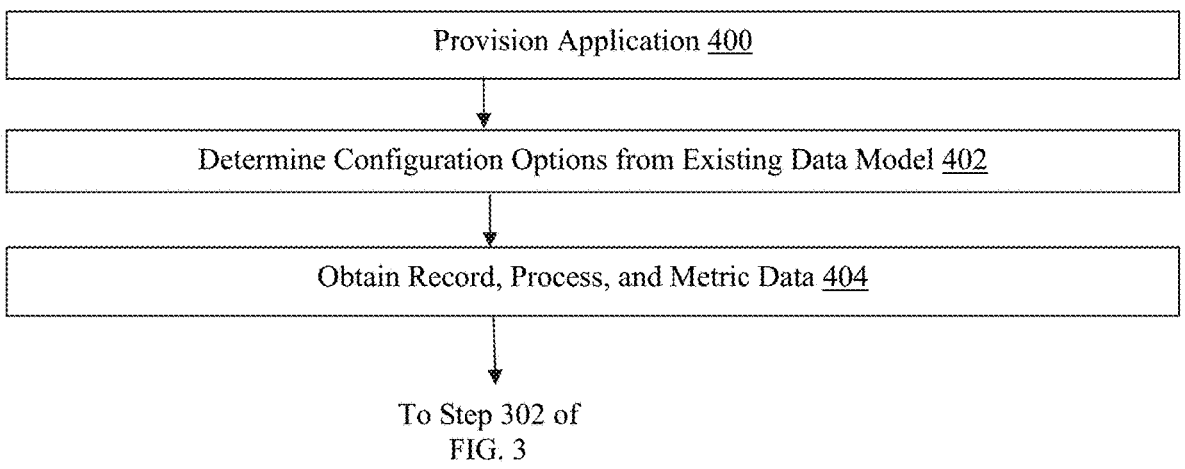
FIG. 4 is a flowchart of an exemplary method for application provisioning to facilitate data collection useful for generating VSMs and associated analytics.

Referring more specifically to FIG. 3, a flowchart of an exemplary method of value stream mapping and management of processes tracked in computer systems is illustrated. At a relatively high level, there are five aspects to this technology, which correspond to stages of creating a VSM based on source data, which include collecting change or event data, configuring the application, processing the collected change data, generating and displaying a user interface that includes a VSM, and generating and displaying analytics. Each of these aspects will now be explained in more detail with reference to FIG. 3.

In step 300 in this example, the application server 104 configures the VSM application 210 based on input from one of the client devices 106 or an administrator device (not shown) in the network environment 100. Configuring the VSM application 210 in this particular example includes provisioning the VSM application 210; reading an existing data model to determine configuration options; and obtaining records of interest; process data for the processes involved in the value stream; and metric data. Each of these aspects will now be described in more detail with reference to FIG. 4 in which a flowchart of an exemplary method for application provisioning to facilitate data collection useful for generating VSMs and associated analytics is illustrated.

In step 400 in this example, the application server 104 provisions the VSM application 210, which can be in response to a selection from one of the client devices 106 of the VSM application 210 from a repository of add-on applications available within the enterprise application platform 102. Accordingly, the VSM application 210 in some examples can be a multi-tenant system that isolates data into different tenants pertaining to an organization, or a copy of the VSM application 210 can be installed in an organization's private network. For each tenant or installation, administrators can create one or more distinct VSMs to describe different work processes.

Figure 5:
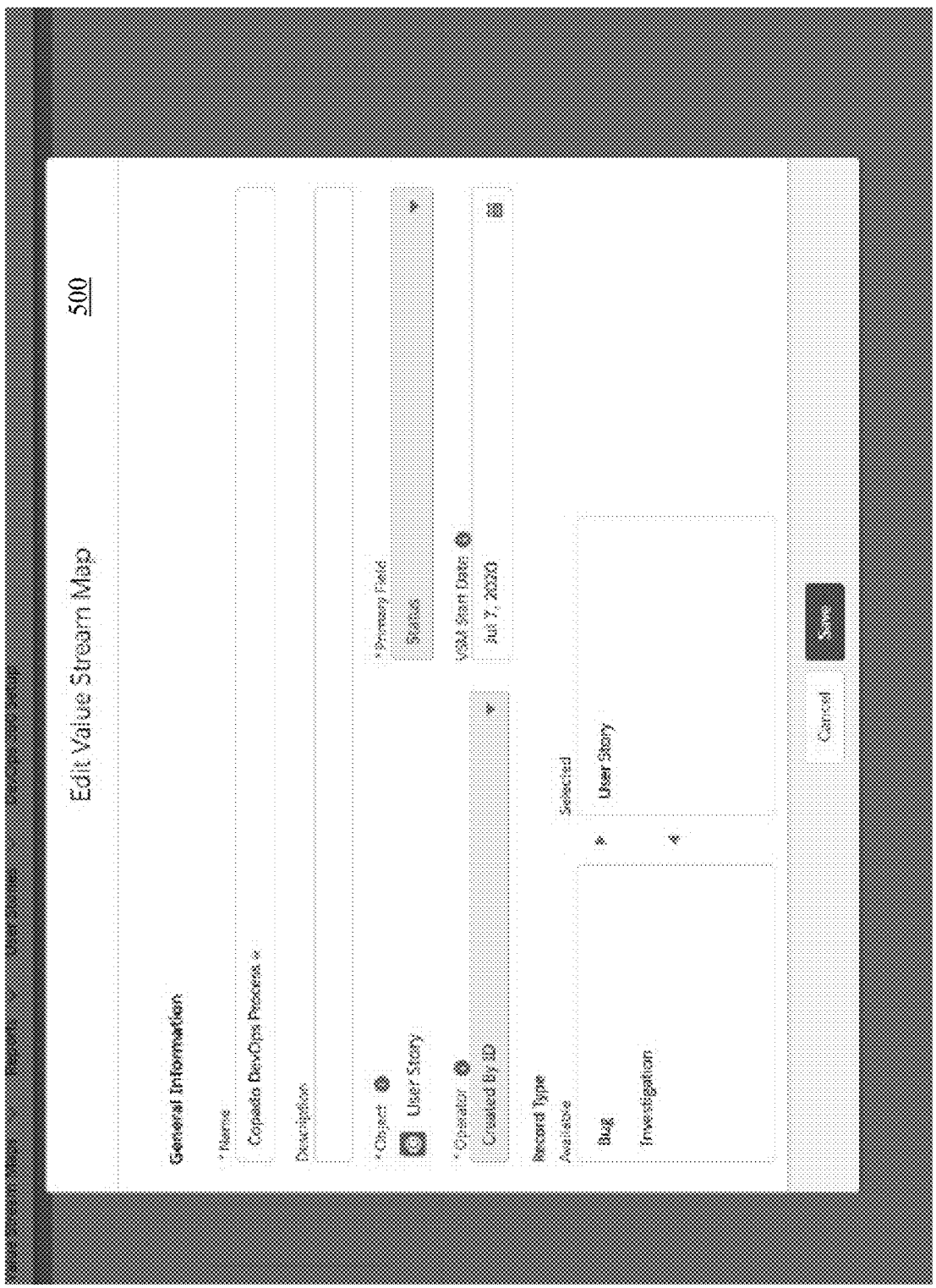
FIG. 5 is an exemplary value stream definition interface.

In step 402, the application server 104 obtains or determines configuration options. Referring to FIG. 5, an exemplary value stream definition interface 500 is illustrated. The value stream definition interface 500 can be provided by the application server 104 to one of the client devices 106, such as a client device used by an administrator. In this example, the administrator can specify a name for a new VSM to be created as well as select the work items to be tracked, which collectively form part of the configuration options.

To define the work items to be tracked, in one example an administrator can select a database table or object that contains records for the work items. In this example, there is one data record in the object for each work item and each object has a corresponding schema, which is readable by the created VSM. Table 1 illustrates a sample data model for the objects that track work items:

TABLE 1

Object: MyWorkItems

| Work Item ID | Record Type | Development Status | Development Worker | Documentation Status | Documentation Worker | Metric 1 |
|---|---|---|---|---|---|---|
| 1000 | Planned Work | In Progress | Alice | Not Started | Charlotte | 500 |
| 1001 | Unplanned Work | Completed | Alice | In Progress | Dave | 20 |
| 1002 | Unplanned Work | In Progress | Bob | Completed | Charlotte | 1300 |
| 1003 | Planned Work | Backlog | Bob | Backlog | Charlotte | 100 |

In step 404, the application server 104 obtains record, process, and metric data for the new VSM. The object schema in this example includes fields of different types and the schema for each object includes at least one field that represents the status of the work item using a fixed set of values. There can be multiple fields that represent the status of the work item from different perspectives. Additionally, there may be a field in the object that defines the record type and distinguishes different categories of work item.

As illustrated in FIG. 5, for each VSM, an administrator can choose the object that will be tracked in the VSM and the field on that object that contains the state of the object in the VSM. Optionally, an administrator can specify that a VSM should reflect only data that is of one or more record types. There can be multiple VSMs configured per object as long as they use different fields to specify the state and/or different record types. Also as reflected in the value stream definition interface 500, an administrator can choose which field on the object represents the worker or operator responsible for that work item. Optionally, that field can be constrained to only list selectable fields based on a link to another database table of workers.

The application server 104 also facilitates definition of the process involved in the value stream for the new VSM in step 404. A value stream as used herein is a series of sub-processes that result in a valuable output. This technology provides a user interface for defining and displaying the sequence of sub-processes involved in a particular process that is tracked and reflected by the VSM.

Figure 6A:
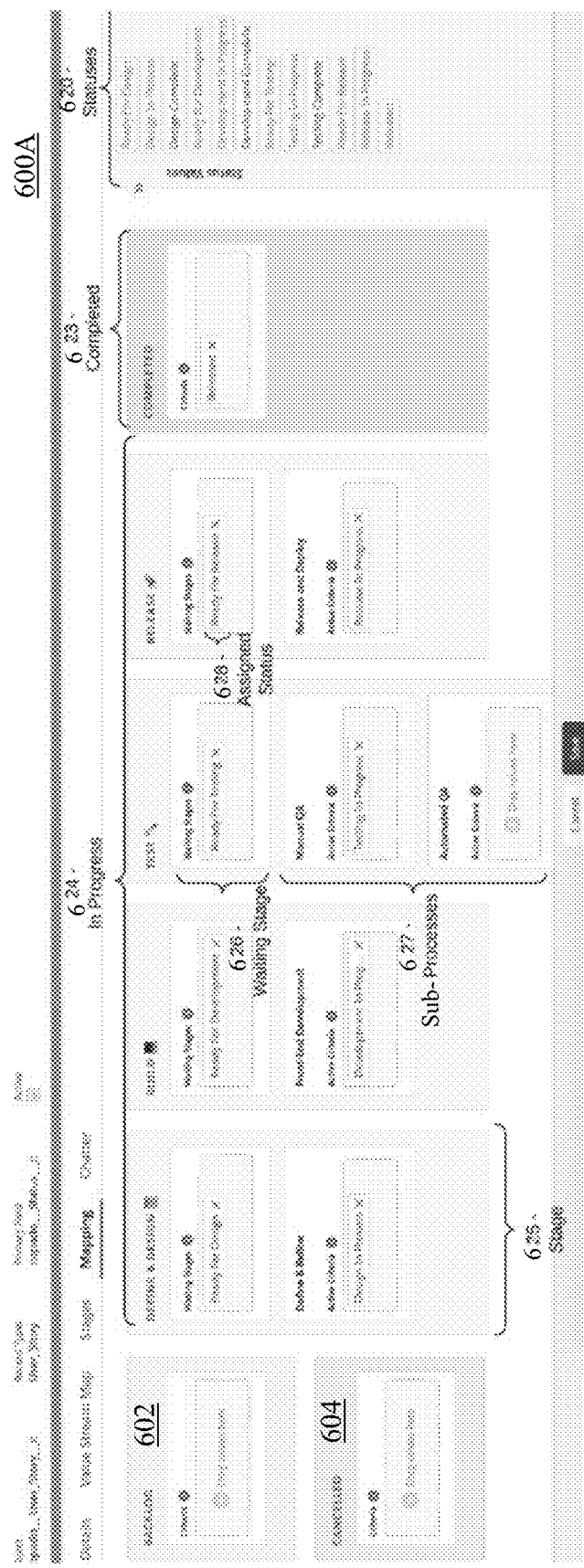
FIGS. 6A-B are exemplary value stream configuration interfaces.
Figure 6B:
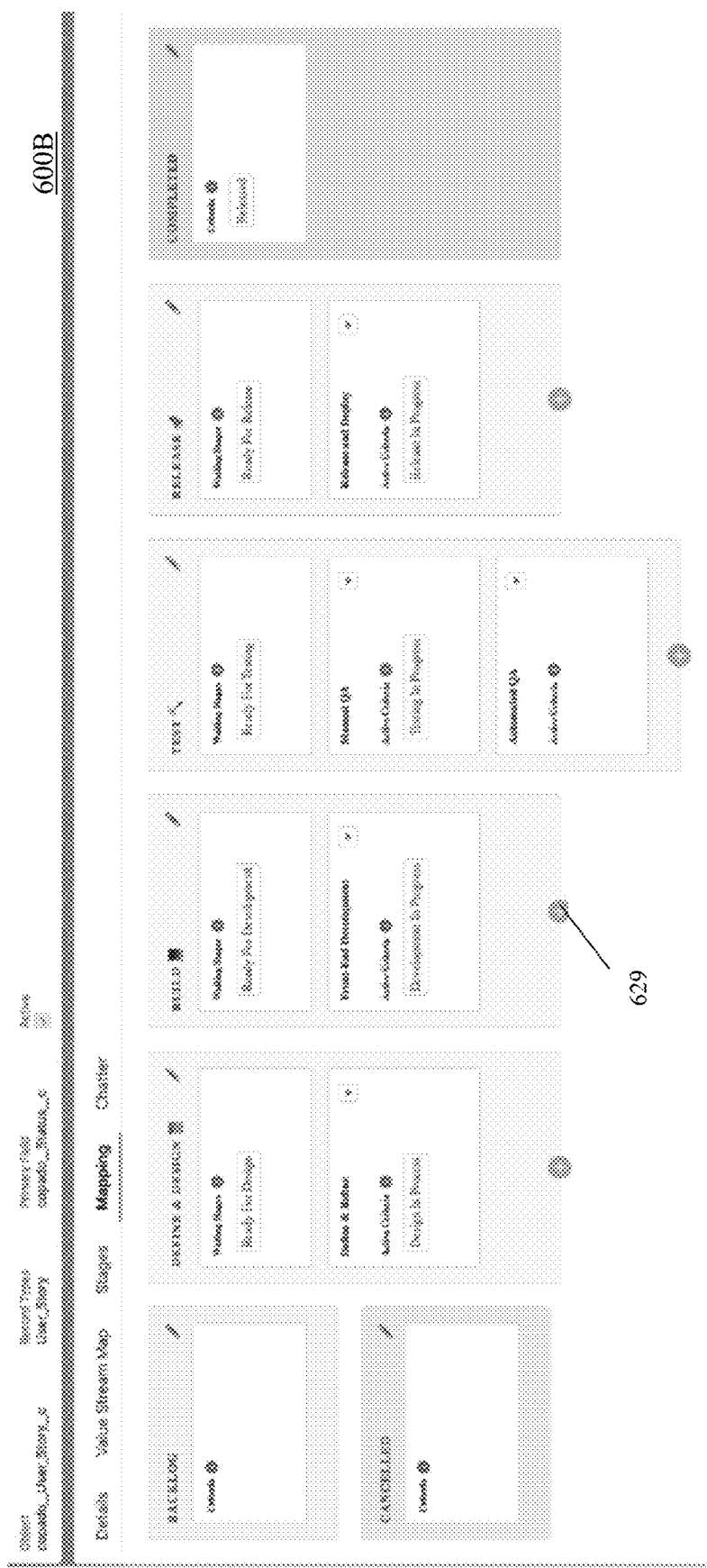
Figure 7:
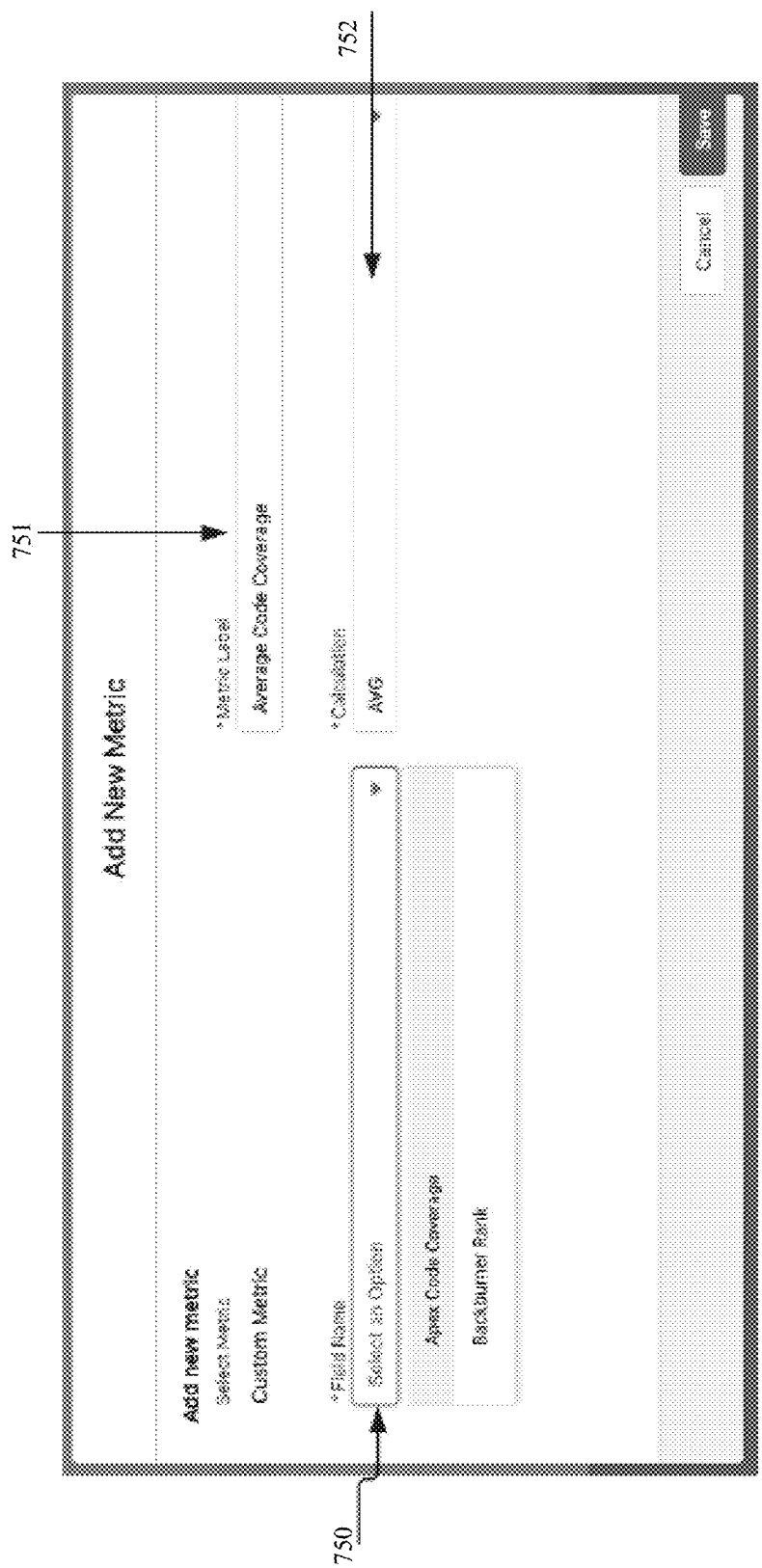
FIG. 7 is an exemplary new metric interface.

Referring to FIGS. 6A-B, exemplary value stream configuration interfaces 600A and 600B are illustrated. Based on the object and status field values obtained in step 402, the application server 104 outputs a status list 620 of allowed values of the status field. The status list 620 is defined either explicitly as part of the database schema or implicitly by enumerating unique values in the database, for example, and other methods for defining the status list 620 can also be used. The statuses in the status list 620 are allocated to different process-blocks that are within stages of the overall process associated with the VSM and correspond to sub-processes of that overall process.

In this example, the allocation or assignment of one or more of the statuses is via a dragging of a status into a process-block within a stage of a graphical panel within the value stream configuration interface 600A, although other methods for allocating statuses can also be used. Statuses can be allocated to stages including backlog 602, cancelled 604, completed 623, or to one of the stages in the in-progress panel 624 (e.g., stage 625) in this example, and statuses from the status list 620 also can remain unallocated.

Each stage in this example includes a waiting area (e.g., waiting stage 626) that corresponds to delays or queues between active work. Within each stage, administrators can define one or more parallel sub-processes via process-blocks (e.g., process-blocks 627) that correspond to active work done in that stage. These serial stages and parallel sub-processes are a model of the value stream, the process through which work is completed. Each waiting area or sub-process in the VSM typically corresponds to one or more status values (e.g., assigned status 628) for a record. Accordingly, the status field values are correlated to parts or stages of the value stream process. This mapping establishes a relationship between the metadata objects, fields, process-blocks, stages, and VSM definition, which is the foundation for analyzing change data to determine the history of work item progress, as described and illustrated in detail below.

The application server 104 also obtains metric data in step 404, although certain metrics such as lead time can be automatically calculated as default metrics on every VSM. The metric data can be obtained via a provided interface, such as the exemplary new metric interface 700 illustrated in FIG. 7. In this example, custom metrics that should be summed or averaged, for example, and displayed alongside other metrics can be defined. In particular, an administrator, for example, can select from a field name menu 750 that identifies numeric fields in the database object that can be used as custom metrics. Each metric can be given a label entered into a label field 751 and the calculation (e.g., an average or AVG) can be defined for the metric label associated with the selected field via a calculation field 752. In this example, custom metrics will be displayed alongside other top-level metrics on the VSM, as described and illustrated in more detail below with reference to FIG. 12.

Figure 8:
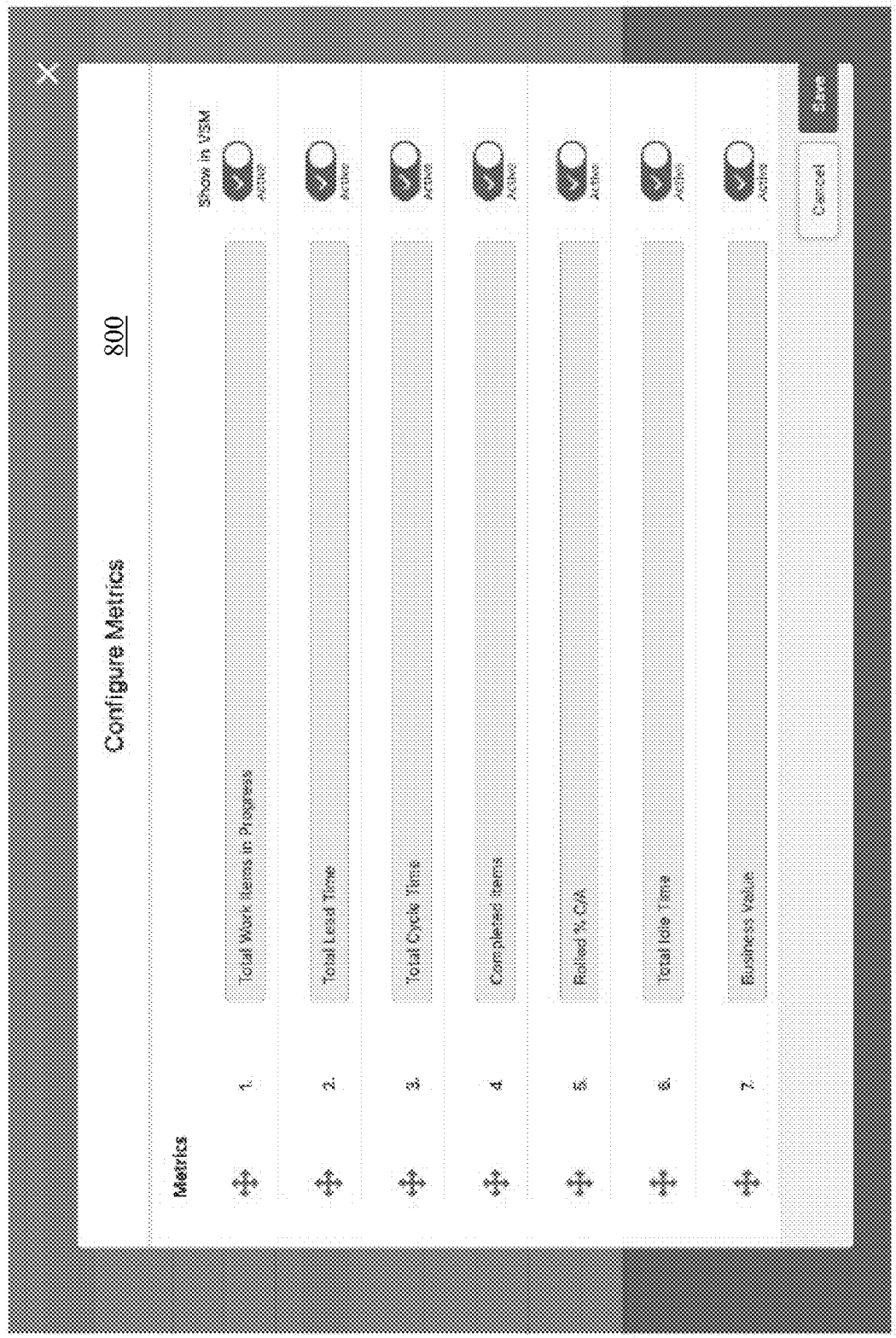
FIG. 8 is an exemplary metric configuration interface.

Referring now to FIG. 8, an exemplary metric configuration interface 800 is illustrated. The metric configuration interface 800 can be used by an administrator, for example, to toggle the display of metrics as well as the order of the metrics, including custom metrics. The application server 104 in this example stores the record, process, and metric data obtained in step 404 to facilitate the subsequent generation of the VSM upon request, also as described and illustrated in more detail below.

Figure 9:
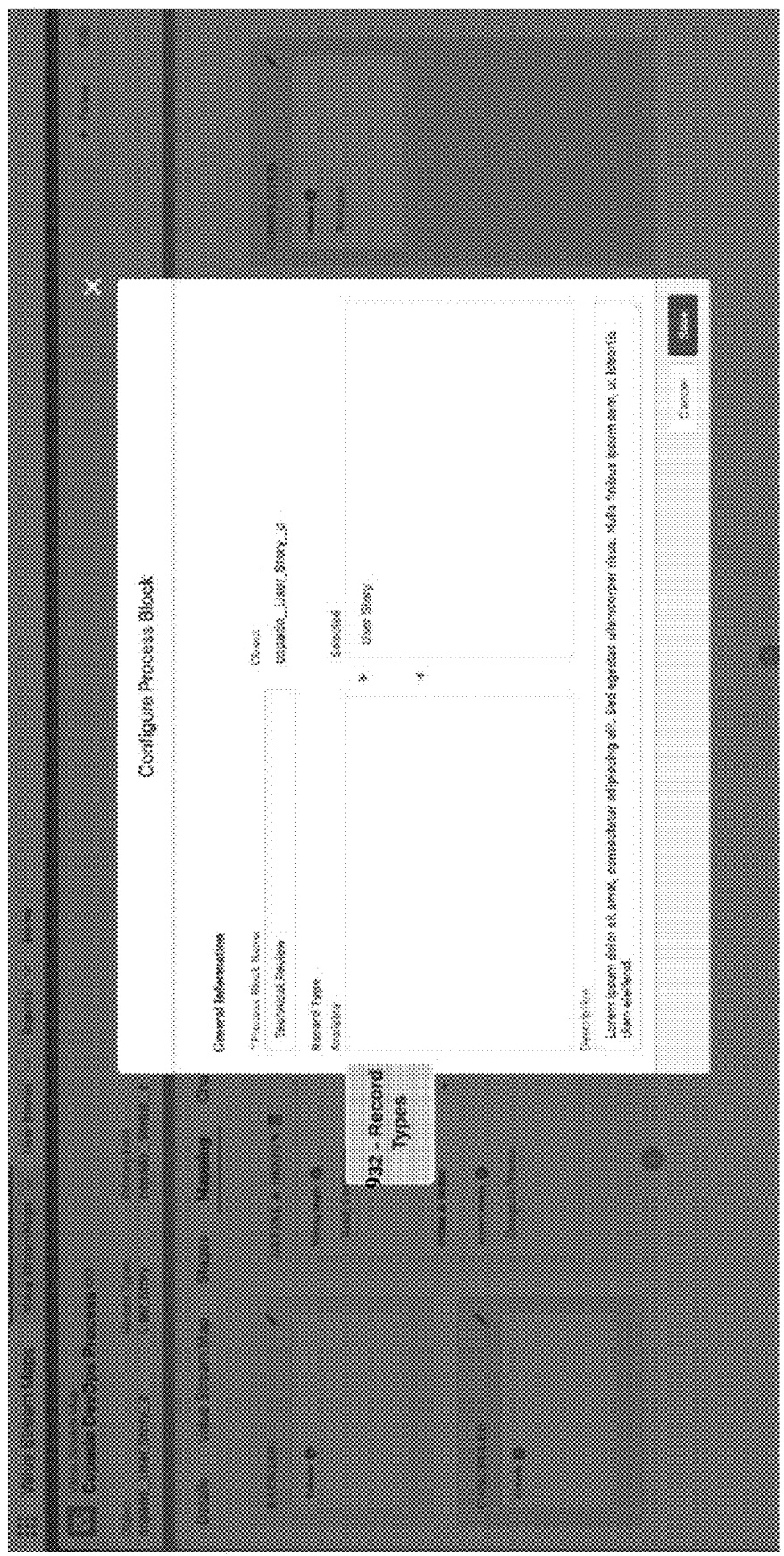
FIG. 9 is an exemplary process-block creation interface.

Referring back to FIG. 6B, the value stream configuration interface 600B is configured to facilitate the creation of new process-blocks via a selectable input 629, which can be done prior to the mapping facilitated by the value stream configuration interface 600A as described and illustrated in more detail above with reference to FIG. 6A. The process-blocks correspond with sub-processes of the overall tracked process associated with the VSM. Optionally, administrators can create multiple process-blocks per stage. Referring to FIG. 9, an exemplary process-block creation interface is illustrated. As illustrated in FIG. 9, any number of record types 932 can be included or excluded from created process-blocks as part of the configuration.

Referring back to FIG. 3, in step 302, the application server 104 collects change data from database(s) associated with the enterprise application platform 102. The change data can be collected periodically via an interface (e.g., an API) provided by the enterprise application platform 102, for example, although other methods for obtaining the change data can also be used. In some examples, the enterprise application platform 102 is configured to maintain activity or event logs that maintain the change data.

The change data is the source data for the VSM and includes a sequence of records representing changes to the state of work items over time. The sequence of data covers changes over an unbroken period of time, although the change data can reflect a partial history including any portion of the overall history of changes for a process. In this particular example, the change data can include a history of changes to the state of a work item, as recorded in a database record, or a history of processes executed over time on those database records. In both cases, the data sources may be derived from other systems, as long as the history of changes in those systems can be put into the particular format described and illustrated by way of the examples herein.

The source for the change data capturing changes to the state of work items is any work item represented as a record in a database that includes a database field that tracks the state of that work item in the overall work process. Changes to the state of a work item are stored in a separate history table in a database in this example. Each time the state of the work item changes, a record is made of this change data in the history table. The record in some examples includes a timestamp, an identifier (ID) of the record that was changed, a name of the associated status field, an original state, and a new state. Some databases such as those hosted on the Salesforce™ platform can create change records automatically whenever a field history tracking feature is enabled for the status field on the work item record. Table 2 illustrates a sample format for status change data on work items:

TABLE 2

| Work Item ID | Timestamp | Field Changed | Old Value | New Value |
| --- | --- | --- | --- | --- |
| 1000 | Dec. 2, 2017 2:39:58 AM | WorkStatus | Planned | In Progress |
| 1000 | Dec. 2, 2017 2:43:26 AM | WorkStatus | In Progress | Complete |

The source for the change data capturing a history of processes executed over time on those database records is a sequential record of activities performed as part of the process associated with the VSM. Whereas the previous data source tracked changes to the state of a work item, this data source contains a sequence of records of activities performed on a work item. Each activity record includes or implies the start time of a process and its duration. The activity records in this example also include an ID of the work item being processed, a type of activity being performed, and a success or failure result. If this information is comprehensive, it can also be used to reconstruct a picture of the complete sequence of activities performed on a work item. Table 3 illustrates a sample format for activity records, which is converted by the application server 104 in step 302 in this example into the format illustrated in Table 2:

TABLE 3

| Activity ID | Activity Type | Record ID | Start Time | Duration | Results |
| --- | --- | --- | --- | --- | --- |
| 423252 | Validate Package | 1000 | Dec. 2, 2017 2:39:58 AM | 0:00:15.000 | Fail |
| 235855 | Run Unit Tests | 1001 | Dec. 2, 2017 2:43:26 AM | 0:12:52.000 | Success |

In step 304, the application server 104 converts the change data collected in step 302 into a summary of activity. Converting the change data into the summary of activity includes identifying records of interest, converting change data into event records, calculating real-time metrics based on work items, processing individual records, calculating aggregate metrics, event recalculation, garbage collection, storing event summaries as snapshots, and high-volume data processing, which will now be described and in detail with reference to FIG. 10.

Figure 10:
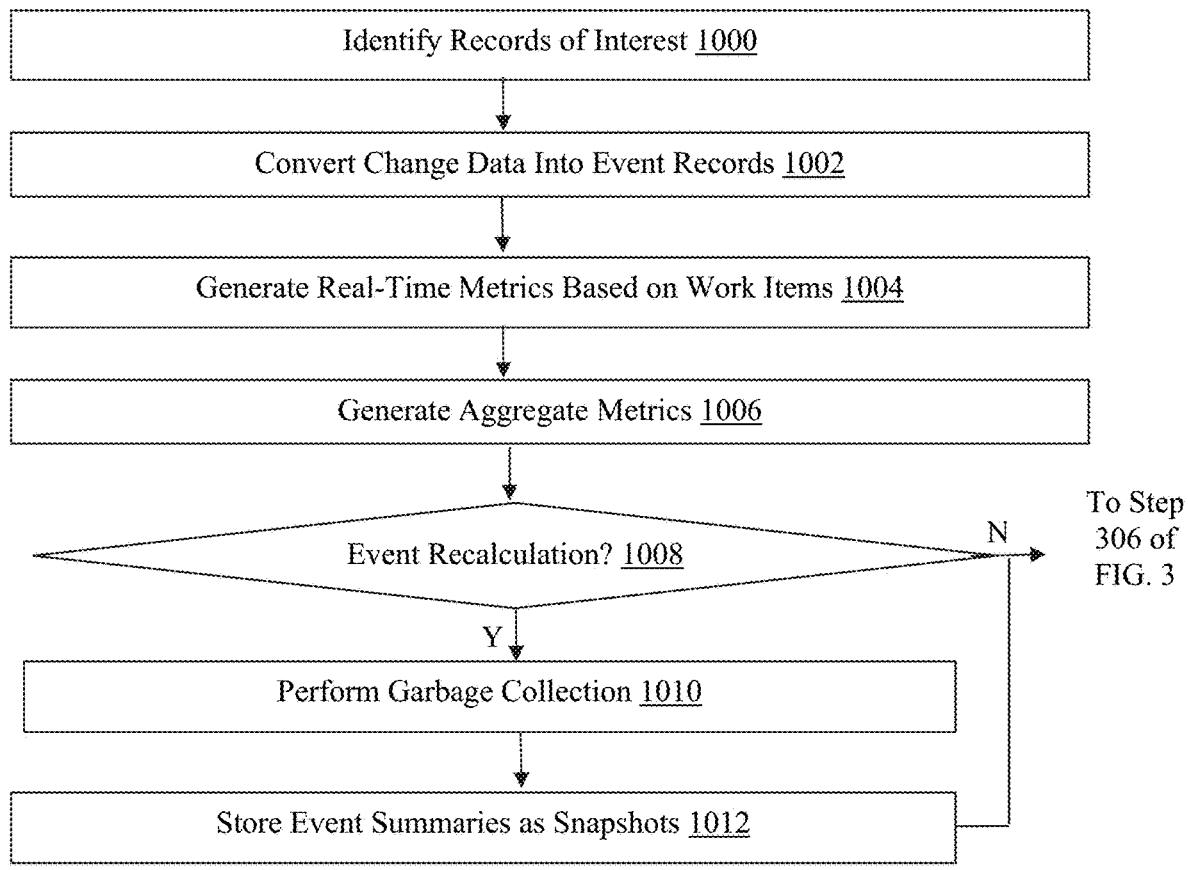
FIG. 10 is a flowchart of an exemplary method for converting change data to a summary of activity useful for generating VSMs and associated analytics.

FIG. 10 illustrates a flowchart of an exemplary method for converting change data to a summary of activity useful for generating VSMs and associated analytics. In step 1000 in this example, the application server 104 identifies records of interest from the state change and activity records generated from the change data collected in step 302. Records of interest in this example are identified based on the parameters defined during VSM application 210 configuration in step 300. After this initial configuration is completed, a VSM can be activated.

Upon activation, the full list of change data is filtered to include only those records that match the object, record type, status field, and status field values. Each VSM is specific to a particular object, record type, and status field. Within the status field, only values that are mapped to stages in an in-progress panel (e.g., in-progress panel 624) or a completed stage (e.g., completed stage 623) of the VSM are included in calculations of the event records. The remaining set of records are the basis for generating metrics for a particular VSM.

In step 1002, the application server 104 converts change data into event records by processing the records of interest and converting those records into event records. Event records track changes that are relevant to a particular VSM, such as entering a particular sub-process, leaving that sub-process, or returning to a prior stage for example. The records of interest are processed to reconstruct the timeline of changes to the work item represented by that record. The history of status changes is stored and processed in sequential order to simplify creation of the timeline.

Accordingly, each state change record is processed to determine whether it reflects a movement of a work item into or out of a different portion of the VSM, such as a waiting area (e.g., waiting stage 626). Status changes that only reflect movement inside of an panel (e.g., changing state between two statuses that are both in the same waiting area) are ignored. Event records are stored in a separate database table in some examples.

Referring to FIG. 11, a screenshot 1100 of exemplary event records 1121, 1122, and 1123 is illustrated. Each event record 1121, 1122, and 1123 in this example has a unique Event ID 124. When a status change record reflects the entry of a work item 1125 into a waiting or active stage, an event record is created that includes a start date/time 1126. When a status change record reflects the exit of a work item from a waiting or active stage, the event record related to its entry is updated to include an end date/time 1127. If no prior event record is found, a new event record is created that includes only the end date/time 1127. Each of the event records 1121, 1122, and 1123 includes an indication of the work item 1125 (e.g., a work item ID) being changed, the operator assigned to the work item 1128, the status that the work item moved into or out of 1129, the stage that this status is assigned to 1130, whether the status is assigned to a waiting or active part of the stage 1131, and, if the status is assigned to an active stage, the sub-process to which the status is assigned 1132.

In some examples, the quality of work done in a VSM is measured based on whether work in one stage is complete and accurate. Work that is complete and accurate as used herein is work that moves onto subsequent stages and never return to the prior stage. Re-entry is defined as a work item that has left a stage and moved forward but then returned to a previous stage. An event code 1133 is used to track whether work leaving each stage is complete and accurate. The combination of stage 1130, active/waiting 1131, and work item ID 1125 are concatenated into the event code 1133 in this example. This event code 1133 is used to identify whether this is the first instance of that particular work item entering that particular stage.

Additionally, the first time a work item 1125 enters the waiting or active area of a stage the event is given a re-entry number 1134 of "0," which is added (e.g., appended) to the event code 1133. If that work item 1125 subsequently re-enters that particular waiting or active stage, it is deemed that there was a quality issue that demanded re-work. A new event record is then generated and given a re-entry number 1134 that is updated (e.g., incremented by 1) from the previous value, and this re-entry number 1134 is again added to the event code 1133. For events that include both a start date/time 1126 and 1127 an end date/time, a lead time 1135 and an elapsed time 1136 can also be calculated from the those values and included in the event records 1121, 1122, and 1123.

Further, if an event record 1121, 1122, and 1123 is updated and has skipped a waiting criteria section, then the event record entry and exit times are equal to account for the movement of work. Although the event record would not therefore reflect time spent in the waiting area, the work item 1125 will be tracked in this example, which is required to generate an accurate historical average for metrics such as idle time, lead time, cycle time, and percentage complete and accurate. Accordingly, the event records 1121, 1122, 1123 are summarized to generate historical cycle time, historical lead time, historical and current idle time, and the percentage complete and accurate metrics at the granularity of individual stages and sub-processes, which are totaled to generate the metrics for the value stream as a whole.

In step 1004, the application server 104 generates real-time metrics based on work items. Status values that are assigned to the backlog stage (e.g., backlog stage 621) during the mapping described and illustrated in more detail above with reference to step 300 and FIG. 6A identify work that is waiting in a queue. In some examples, the number of items in a backlog state is a real-time metric calculated based on the number of work items that have statuses assigned to the backlog stage. Work items associated with a backlog status do not generate event records nor contribute to the lead time, cycle time, percentage complete and accurate, or any custom metrics in some examples.

Status values which are applied to a cancelled stage (e.g., cancelled stage 622) during the mapping described and illustrated in more detail above with reference to step 300 and FIG. 6A identify work that is cancelled and is no longer being worked by any operators or workers. The number of items in a cancelled state is a real-time metric calculated based on the number of work items that have statuses assigned to the cancelled state. Other metrics, such as cancellation rate, can be calculated by comparing work items that were once active but have now been cancelled.

Status values which are assigned to a completed stage (e.g., completed stage 623) during the mapping described and illustrated in more detail above with reference to step 300 and FIG. 6A identify work that is completed. The VSM can display metrics on completion rate, number of items in a completed state, and time-to-completion. Any items associated with a completed state have exited an in-progress stage and do not generate event records nor contribute to the number of work items in progress metric.

Status values assigned to one of the stages in an in-progress panels (e.g., in-progress panel 624) during the mapping described and illustrated in more detail above with reference to step 300 and FIG. 6A identify work that is in-progress and actively being worked by identified workers/operators. In addition to the events described above, in-progress work items contribute to metrics such as current number of work items and number of unique workers/operators, for example. Accordingly, in step 1004, the application server 104 processes the event records generated in step 1002 to generate various real-time metrics based on the work items identified therein, which can subsequently be incorporated into and displayed via the VSM.

In step 1006, the application server 104 generates aggregate metrics for subsequent inclusion in the VSM. Aggregate metrics are based on the events generated from work items that have moved through in-progress stages associated. Aggregation of metrics for lead time, cycle time, percentage complete and accurate, and idle time, for example, are divided by stages to provide a weighted historical average for all stage, process-block, and top level metrics.

Idle time as used herein relates to the historical time a work item spent in a waiting stage. Idle Time has a corresponding work item count which displays in real-time how many work items are currently contributing to the idle time. Cycle time as used herein is the actual operating time for a work item and is calculated from the event records by summing the amount of time work items spend in a process-block (i.e., an active state).

Lead Time within the process-block as used herein is determined by taking a sum of the historical idle time plus the cycle time for a given stage and the associated process-block. The overall lead time for the VSM is the sum of lead times for all of the stages. For stages that contain multiple process-blocks, a weighted average of the lead times for those process-blocks is used. For example, assume there are two parallel process-blocks corresponding to sub-processes of the overall process represented by the VSM in one stage, 20% of work items pass through sub-process 1 taking an average of 10 hours to complete, and 80% of work items pass through sub-process 2 taking an average of 5 hours to complete. In this particular example, the weighted average of lead time for this stage is 20%*10 hours+80%*5 hours=6 hours.

In some examples, quality is measured based on a percentage complete and accurate metric, which corresponds with how frequently work items are sent back to a previous stage or process-block within a stage. The overall percentage complete and accurate metric for the VSM is the product of the percentage complete and accurate for all stages. For example, if there are two stages, and the first stage is 80% complete and accurate and the second stage is 50% complete and accurate, then the value stream is 40% complete and accurate. Work items and operators that are displayed in the process-blocks and stages are advantageously determined in real-time to show the exact work item counts and associated operators based on the VSM configuration.

Additionally, custom metrics can be calculated for use cases where end users require a set of unique metrics to be displayed on the VSM. The custom metric can be calculated from any numeric field that is on the metadata object associated with the VSM. Custom metrics defined for that VSM can be either summed or averaged, for example, and other types of calculations for custom or other metrics can also be used in other examples. Accordingly, in step 1006, the application server 104 processes the event records generated in step 1002 to generate various aggregate metrics based on the work items identified therein, which can subsequently be incorporated into and displayed via the VSM.

In step 1008, the application server 104 optionally determines whether a recalculation event has occurred as a result of a change to the VSM definition, for example. When the definition of a VSM is changed, the events associated with that VSM become outdated and can be deleted (e.g., via marking as inactive and a subsequent garbage collection). VSM changes that result in a recalculation event and potential invalidation of events include a change in a status tied to a process-block, removal of a process-block from a stage, creation of a process-blocks, and removal or creation of a stage, for example. Event records marked as inactive are excluded from metric calculations.

In some examples, the condition in step 1008 is checked periodically and in other examples the VSM application 210 provides a selectable input element (e.g., a button) that facilitates a forced recalculation. If the application server 104 determines that a recalculation event has not occurred, then the No branch is taken back to step 310 of FIG. 3. However, if the application server 104 determines that a recalculation event has occurred, then the Yes branch is taken to step 1010.

In step 1010, the application server 104 performs a garbage collection process. While in this example the garbage collection is performed when a recalculation event is determined to have occurred, the garbage collection can also be performed at other times independent of the recalculation events in other examples. To perform garbage collection, the application server 104 identifies inactive event records (e.g., event records marked as inactive due to a deletion).

In addition to a recalculation event, events records can be marked as inactive as a result of being directly deleted or as a result of an association with a deleted process-block, stage, or VSM, for example. In the event that a work item is deleted, any associated event records are identified and marked as inactive. Accordingly, the garbage collection process is a mechanism for the application server 104 to delete inactive event records as a result of a deletion of a work item, a deletion of a VSM, or a change in configuration of a VSM, for example.

In step 1012, the application server 104 stores event summaries as snapshots. As with step 1010, the application server can store event summaries as snapshots independent of the event recalculation determination in other examples. In this example, the application server 104 can store preprocessed metrics for faster display, which is particularly advantageous for processes that are associated with large amounts of data. The event summary snapshots can be stored as files that are used bypass the need to calculate particular data or metrics with every display of the VSM. The snapshot files also avoid processing limits which may be enforced by the underlying enterprise application platform 102. Subsequent to storing event summaries as snapshots in step 1012, the application server proceeds back to step 306 of FIG. 3 in this example.

In step 306, the application server 104 determines whether a VSM is requested. The VSM can be requested by any of the client devices 106 via the communication network(s) 108. Users can select to view a particular VSM by reviewing a list of the created VSMs, for example. If the application server 104 determines that a VSM has not been requested, then the No branch is taken back to step 302 and the application server 104 continues to periodically collect change data and convert the change data to a summary of activity. However, if the application server 104 determines that a VSM has been requested, then the Yes branch is taken to step 308.

In step 308, the application server 104 generates and displays the requested VSM. The VSM includes metrics with varying levels of granularity that are generated as described and illustrated in detail above with reference to steps 1002-1004 of FIG. 10. Calculating all of the metrics on the application server 104 with each view requires a large number of calculations to be performed in a short span of time, and so can cause delays in page loading and high volumes of database queries. To optimize display time, each stage and process-block can be associated with client-side code that runs in a web browser executed by the each of the client devices 106. This client-side code allows each stage and process-block to request server-side data individually and facilitates parallel loading that allows the pages of a VSM to load relatively quickly and metrics to be displayed as the data is returned from the application server 104.

Figure 12:
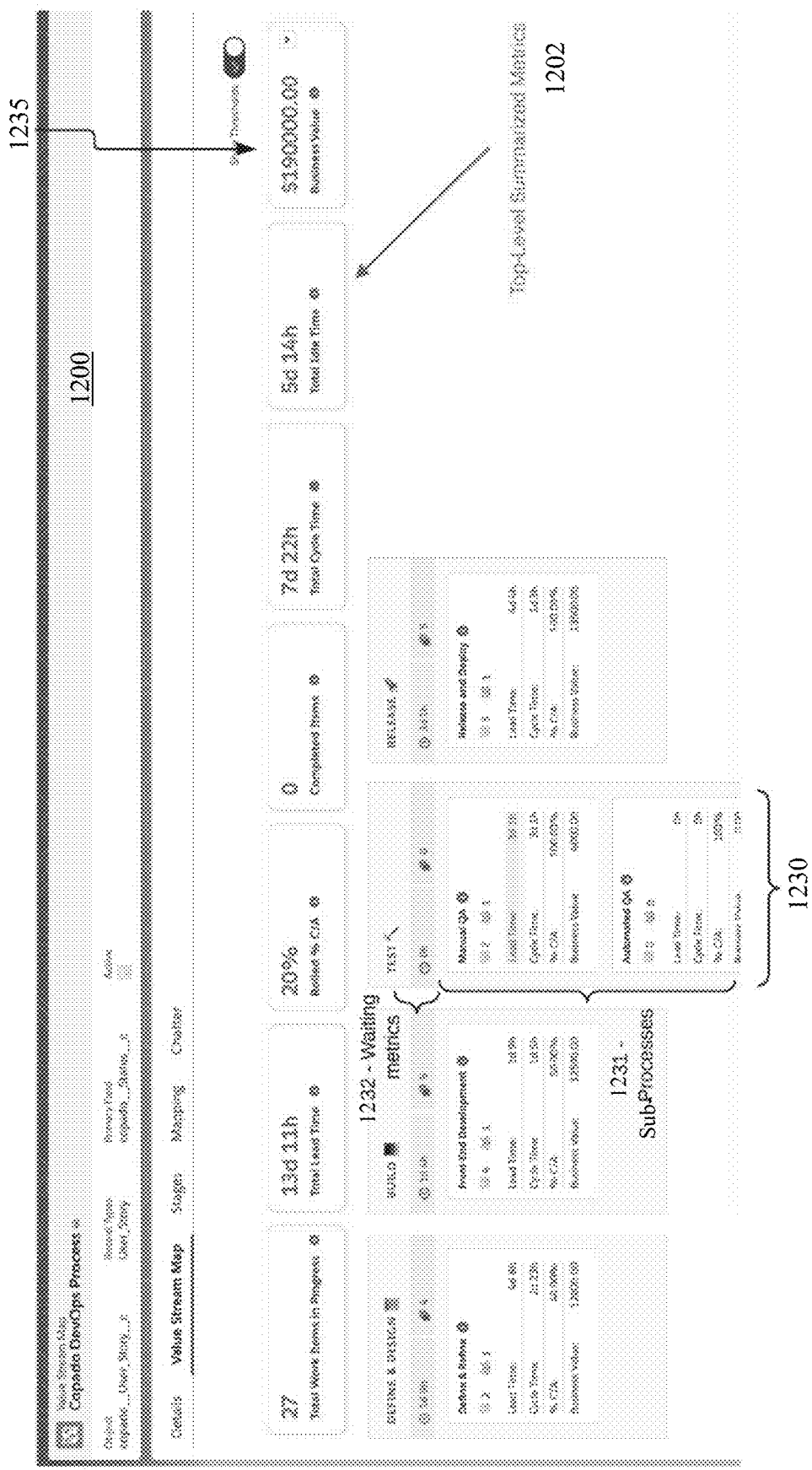
FIG. 12 is an exemplary VSM.

Referring to FIG. 12, an exemplary VSM 1200 is illustrated. The stage display 1230 and sub-process display 1231 in this example are based on the stage 625 and process-blocks 627 in the in-progress panel 624 of the value stream configuration interface 600A. At the top of each stage display are metrics 1232 on the typical idle time and number of items currently waiting to be processed in that stage in this particular example. The calculated metrics are overlaid on top of the VSM 1200 after it is configured, mapped, and activated. Additionally, custom metrics 1235 established as described and illustrated above are displayed alongside other top-level aggregate or summarized metrics 1202 in this example.

Figure 13:
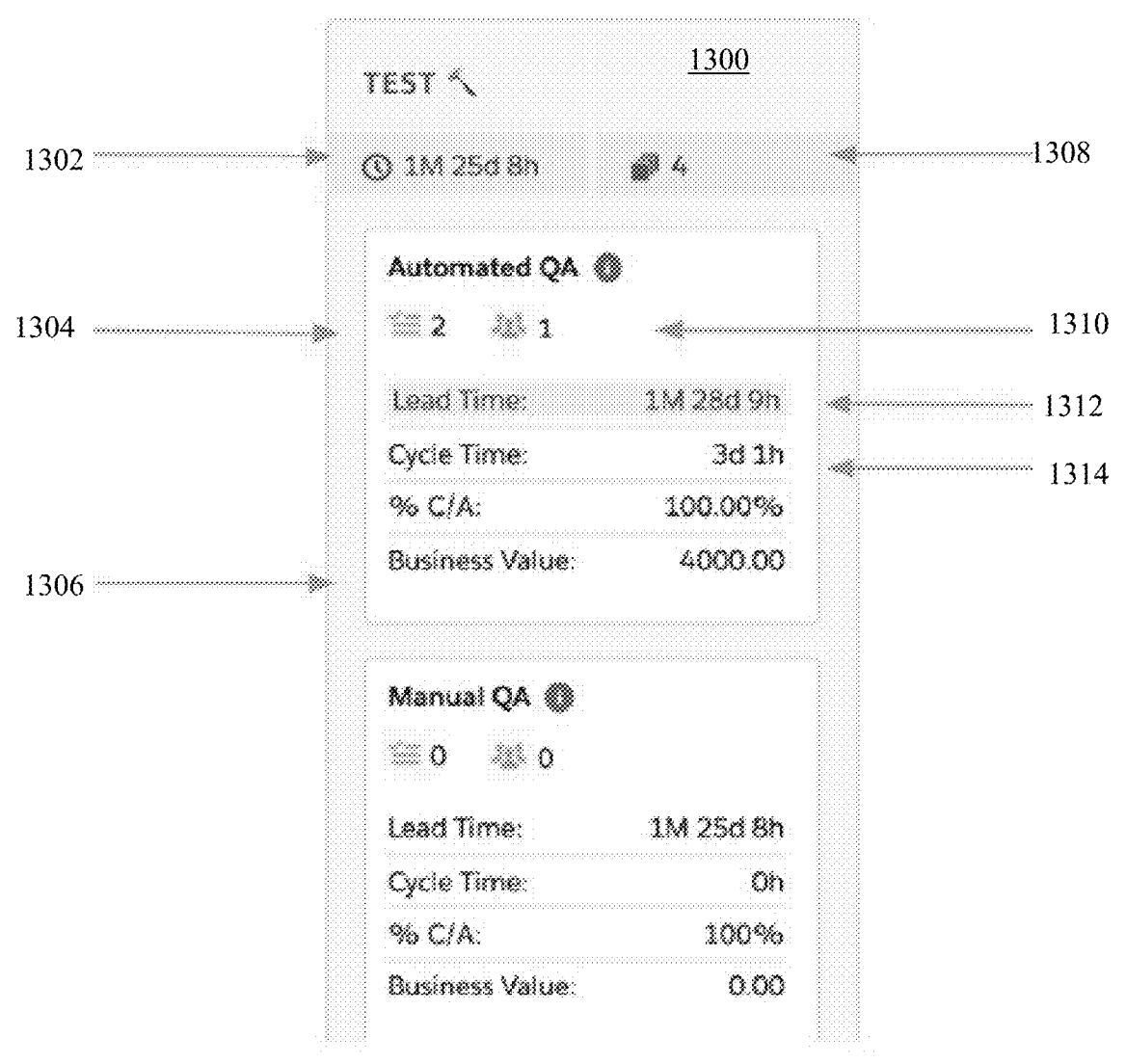

Referring to FIG. 13, a screenshot 1300 of exemplary value stream management metrics details for a stage is illustrated. The metrics details shown in FIG. 13 illustrate the variety of metrics that are made available to the user through the VSM for process-blocks within a stage. In this particular example, the metrics details include the idle time 1302, number of items in the particular process-block 1304, custom metrics 1306, number of items in waiting section 1308 number of operators 1310, lead time 1312, and percentage complete and accurate 1314, although any number of other metrics can also be used in other examples.

Figure 14:
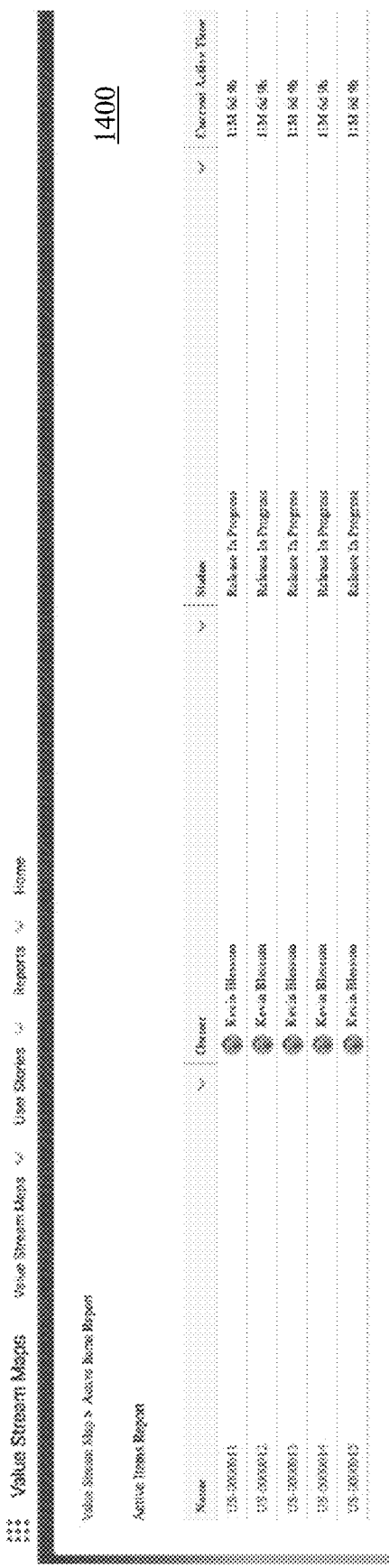
FIG. 14 is a screenshot of exemplary underlying records in a VSM.

Additionally, users in some examples can view and access underlying records related to a VSM. Referring to FIG. 14, a screenshot 1400 of exemplary underlying records in a VSM is illustrated. In this example, each component within the VSM 1200 is selectable and can show the user underlying records. The underlying records are displayed in a table format and include hyperlinks so that the user can click on the work item to take action, if desired. The count of workers acting on the work items can also be displayed on all of the active and waiting stages.

Figure 15:
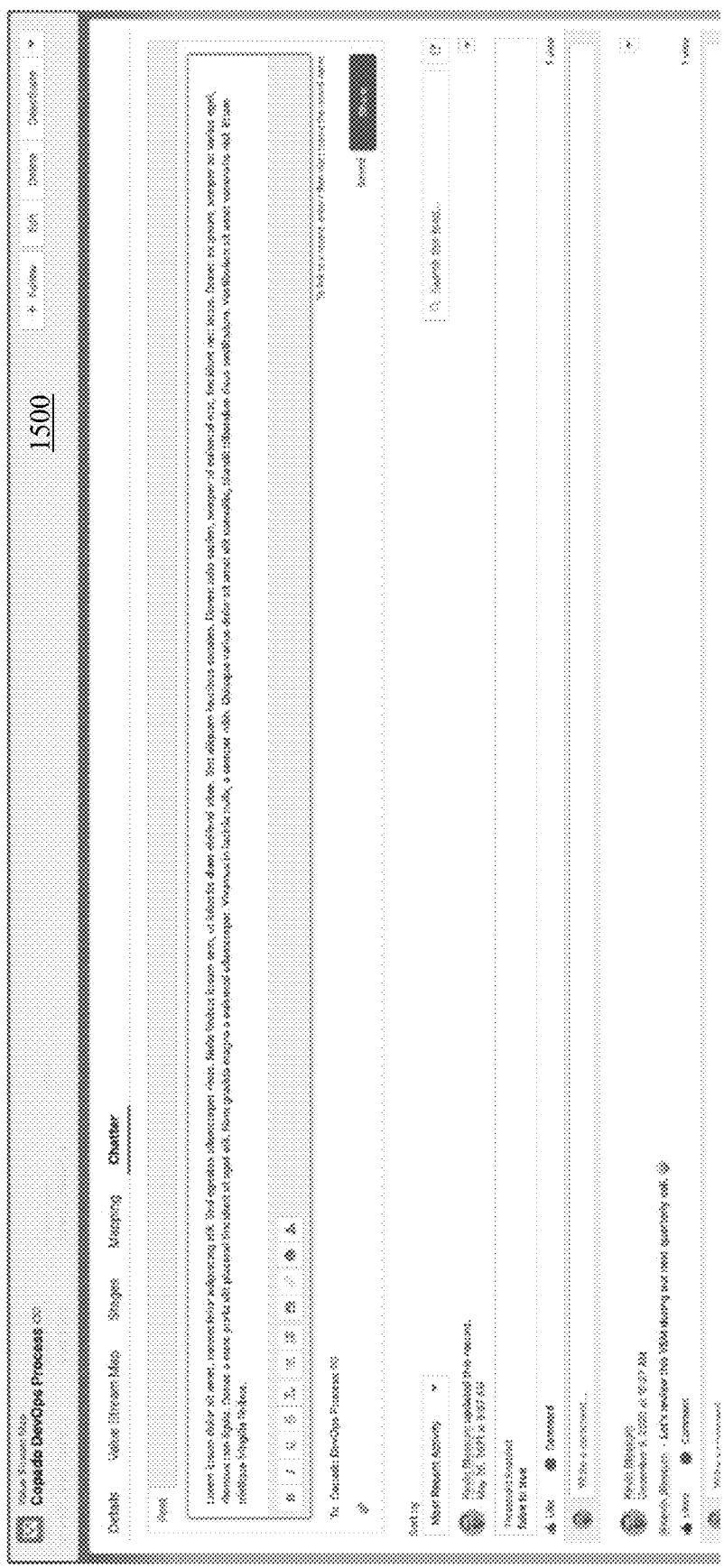
FIG. 15 is an exemplary screenshot of an integrated chat application.

A VSM in some examples of this technology also facilitates collaboration on particular records. Referring to FIG. 15, an exemplary screenshot 1500 of an integrated chat application is illustrated. Those who can participate in a conversation include users who are in the system of record. Users can have text conversations on a VSM and reference any attributes to the VSM in the text conversation, for example, and other types of collaboration can also be facilitated with this technology.

Figure 16:
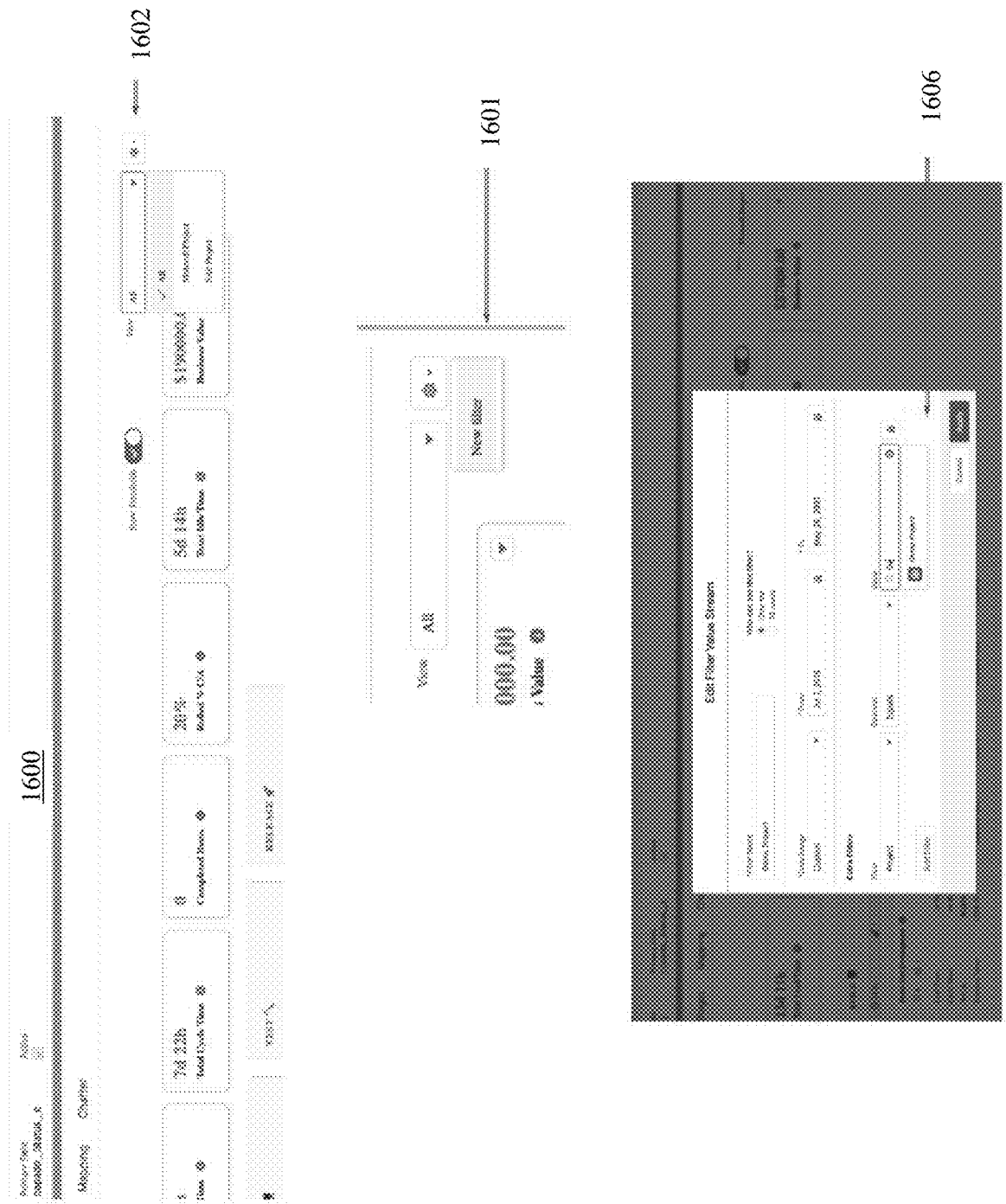
FIG. 16 is an exemplary filter interface.

A VSM also can be filtered by users to show only a subset of data. Filters can be created, configured, and displayed on the VSM to allow users to quickly change the filters. Records can be filtered based on data range. In addition, any field on the object used to store the work items can be used as filter criteria. Referring to FIG. 16, an exemplary filter interface 1600 is illustrated. The filter interface 1600 for creating filters obtains the available list of fields from the database schema and displays a window to allow users to apply the filter. In the example illustrated in FIG. 16, a dropdown menu 1602 facilitates selection of a new filter indication 1604, which generates a filter overlay 1606 that includes a plurality of filter input fields. The application server 104 is configured to recalculate all of the metrics associated with a VSM based on the subset of event records that meet the filter criteria upon application of a filter.

Figure 17:
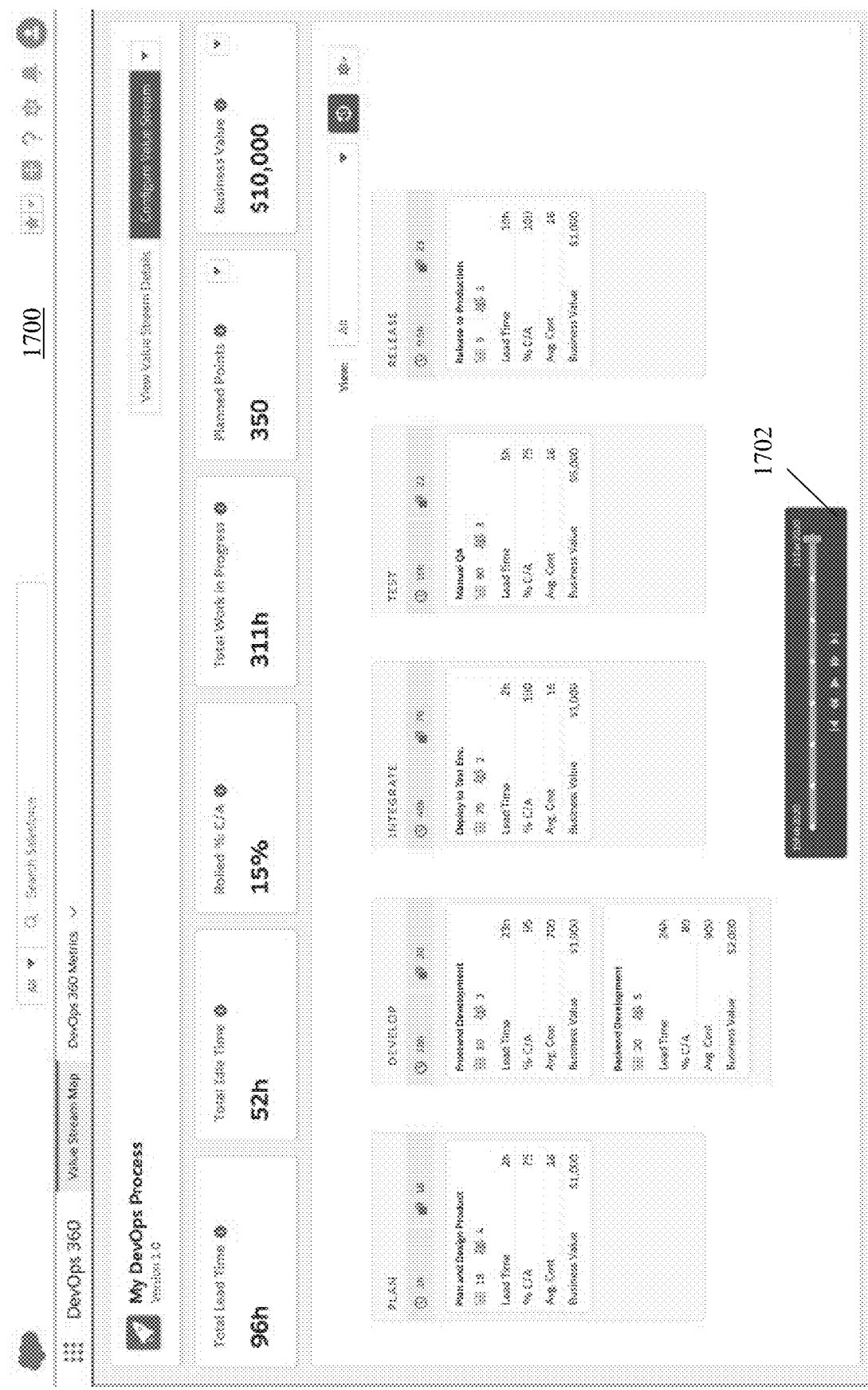
FIG. 17 is exemplary timelines interface.

Optionally, the VSM of this technology can include a timeline feature that allows users to enable a particular filter as a data timeline filter so that users can filter a specific time window for snapshot capabilities. Referring to FIG. 17, a an exemplary timelines interface 1700 is illustrated. Data filters can be input via a filter overlay (e.g., filter overlay 1606 of FIG. 16) allowing a user can go back in time to compare snapshots of data on a VSM as shown in FIG. 17. A slider 1702 is displayed to allow quick filtering to a specific time window. Upon receiving an interaction with the slider 1702, the application server can update the displayed VSM to include relevant metrics related to that time window based on a recalculation and/or retrieval of metric data from the event summaries stored as snapshots in step 1012.

Additionally, the VSM of this technology optionally facilitates a visual indication of individual stages and process-blocks based on configured thresholds. Thresholds can be configured for any metric for a stage including the number of work items and idle time. Once configured, thresholds can optionally be hidden with a toggle feature. Thresholds can also be configured for any metric displayed for a process-block including the number of work Items, the number of operators, lead time, cycle time, percentage complete and accurate, and custom metrics. Thresholds can support numeric values and can be triggered if values fall lower or higher than any particular metric.

Further, the application server 104 can facilitate tracking of statistically significant increases or decreases in trends based on a threshold that is set. Once a threshold is configured, a VSM can track the trend of the metric and display it to the user as a positive or negative trend. The trends are highlighted on a VSM using the threshold colors, for example. Even further, the VSM can be configured to automatically send notifications in the form of notifications to a chat client or email, for example, based on a threshold that is exceeded and stored preferences or contact information.

Figure 18:
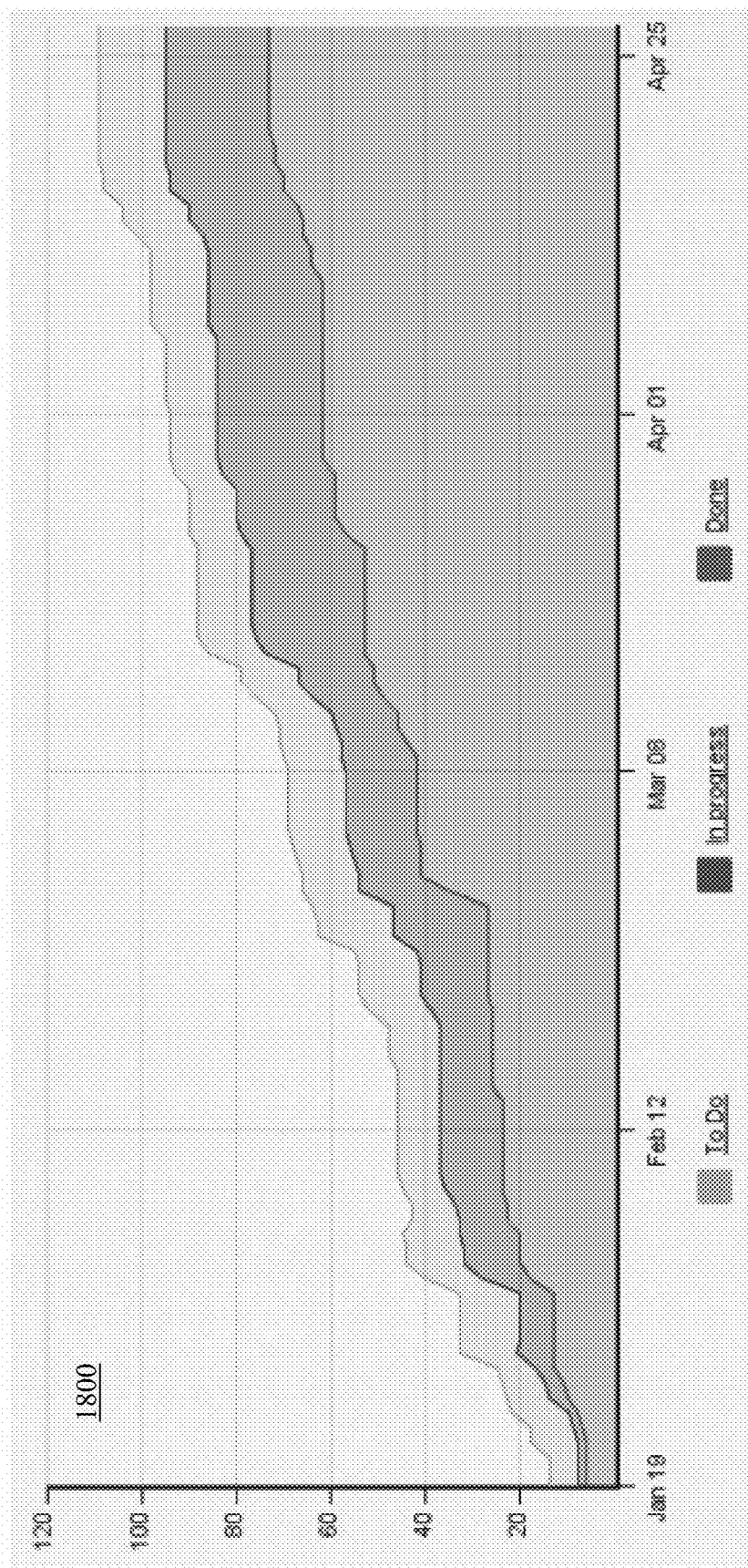
FIG. 18 is an exemplary cumulative flow graph.

VSM events can be utilized by the application server 104 to display graphs of any type to show a progression over time by stage. One visualization that summarizes the movement of work over time is a cumulative flow graph, which is a stacked area chart. Referring to FIG. 18, an exemplary cumulative flow graph 1800 is illustrated. In the cumulative flow graph 1800, the horizontal (x) axis represents time and the vertical (y) axis represents the number of work items in various statuses over time. The height of the lower layer of the cumulative flow graph 1800 corresponds to the number of work items that have one of the completed statuses at that point in time. The height of the next layer of the cumulative flow graph 1800 corresponds to the number of work items in the right-most stage in the VSM. Each subsequent layer in the cumulative flow graph 1800 is calculated in the same way, totaling the remaining stages from right to left. The raw data for these calculations is stored alongside the snapshots described and illustrated above. Each row in the data table represents one unit of time (e.g., one day). The heights of each subsequent stage, along with the ID of that stage, are stored as numbered columns in a table, allowing for an arbitrary number of stages to be tracked in a compact data format.

Referring back to FIG. 3, subsequent to generating and displaying a VSM in this example, the application server proceeds back to step 302. In other examples, one or more of the steps illustrated in steps 3-4 and 10 can be performed by the application server 104 in a different order and/or in parallel with one or more other of the steps. Accordingly, the application server 104 is continuously or periodically collecting and processing change data to facilitate presentation of a user interface including a VSM upon request.

The VSM provided with this technology includes an optimized graphical layout with a rich set of metrics facilitated based on an underlying format and particular processing of change data obtained via an enterprise application platform. Accordingly, as described and illustrated herein, this technology tracks electronic processes carried out on enterprise application or cloud platforms more effectively, and generates VSMs that include a robust set of data and metrics and varying levels of granularity to allow users to gain insights regarding stages and sub-processes to facilitate optimization of the associated overall tracked process.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for value stream mapping and management of processes automatically tracked in computer systems, the method implemented by one or more computing devices and comprising:

accessing a database to retrieve a sequence of changes to database records about a linear process, wherein the retrieved sequence serves as a time series of log data about the linear process, wherein the database records are generated based on user interactions with an enterprise application network as part of the linear process; and transforming the time series of log data into statistical summaries of progress of work items associated with the linear process to create a visual model of the linear process, wherein the visual model comprises a value stream map (VSM); and wherein the accessing and transforming steps comprise:

obtaining and storing a mapping of status values to process-blocks within stages associated with the linear process performed on the enterprise application network, wherein the process-blocks each correspond with one of a plurality of sub-processes of the linear process;

correlating status values for the work items determined from the change records of the database with the mapping to identify one of the stages for each of the work items, wherein the change records further comprise a timestamp;

generating event records based on the correlation, activity records of the database, and another correlation of unique identifiers of the work items in the change records and the activity records, wherein each of the activity records comprises a start time and a duration of one of the sub-processes, a type of activity, and a result of the activity; and generating the VSM, wherein the VSM comprises an output display of a graphical timeline of activity associated with the linear process and real-time metrics for the process-blocks or stages, and aggregate metrics for the linear process, generated based on the event records.

2. The method as set forth in claim 1, wherein the transforming step further comprises determining movement of one or more of the work items forward or backward with respect to the linear process based on the identified stages to:

generate one or more of speed, quality, or load metrics; or determine whether work associated with the work items is complete and accurate.

3. The method as set forth in claim 1, further comprising:

determining a schema of the database and obtaining work item records for the work items, wherein the work item records comprise characteristics associated with the work items and the schema includes at least one field that represents the work item status; and modifying the VSM based on received filter criteria corresponding to one or more of the characteristics or a time at which work associated with one or more of the work items was performed.

4. The method as set forth in claim 1, further comprising automatically generating an electronic notification when one or more stored thresholds is determined to be exceeded based on a comparison of one or more of the metrics to one or more of the stored thresholds.

5. The method as set forth in claim 1, wherein the transforming step further comprises converting a plurality of activity logs automatically generated and stored by the enterprise application network into the activity records, wherein the event records collectively comprise a history of state changes for each of the work items.

6. The method as set forth in claim 1, further comprising sending to a client device client-side code configured to, when executed by a web browser of the client device, request server-side data for one or more of the stages or process-blocks in parallel and display at least a subset of the metrics via the VSM in parallel.

7. The method as set forth in claim 1, further comprising:

provisioning a customizable VSM application as an add-on application within the enterprise application network, wherein execution of the customizable VSM application causes the accessing and transforming steps to be performed.

8. The method as set forth in claim 7, further comprising:

customizing the customizable VSM application via a drag and drop user interface, wherein the customizing step comprises defining the linear process, the sub-processes, and correlations of the sub-processes to states of work items in the database in response to user inputs through the drag and drop user interface.

9. A non-transitory computer readable medium having stored thereon instructions for value stream mapping and management of processes automatically tracked in computer systems comprising executable code that, when executed by one or more processors, causes the one or more processors to:

access a database to retrieve a sequence of changes to database records about a linear process, wherein the retrieved sequence serves as a time series of log data about the linear process, wherein the database records are generated based on user interactions with an enterprise application network as part of the linear process; and transform the time series of log data into statistical summaries of progress of work items associated with the linear process to create a visual model of the linear process, wherein the visual model comprises a value stream map (VSM); and wherein the access and transform operations include operations that:

obtain and store a mapping of status values to process-blocks within stages associated with the linear process performed on the enterprise application network, wherein the process-blocks each correspond with one of a plurality of sub-processes of the linear process;

correlate status values for the work items determined from the change records of the database with the mapping to identify one of the stages for each of the work items, wherein the change records further comprise a timestamp;

generate event records based on the correlation, activity records of the database, and another correlation of unique identifiers of the work items in the change records and the activity records, wherein each of the activity records comprises a start time and a duration of one of the sub-processes, a type of activity, and a result of the activity; and generate the VSM, wherein the VSM comprises an output display of a graphical timeline of activity associated with the linear process and real-time metrics for the process-blocks or stages, and aggregate metrics for the linear process, generated based on the event records.

10. The non-transitory computer readable medium as set forth in claim 9, wherein the executable code, when executed by the one or more processors, further causes the one or more processors to determine movement of one or more of the work items forward or backward with respect to the linear process based on the identified stages to:

generate one or more of speed, quality, or load metrics; or determine whether work associated with the work items is complete and accurate.

11. The non-transitory computer readable medium as set forth in claim 9, wherein the executable code, when executed by the one or more processors, further causes the one or more processors to:

determine a schema of the database and obtain work item records for the work items, wherein the work item records comprise characteristics associated with the work items and the schema includes at least one field that represents the work item status; and modify the VSM based on received filter criteria corresponding to one or more of the characteristics or a time at which work associated with one or more of the work items was performed.

12. The non-transitory computer readable medium as set forth in claim 9, wherein the executable code, when executed by the one or more processors, further causes the one or more processors to automatically generate an electronic notification when one or more stored thresholds is determined to be exceeded based on a comparison of one or more of the metrics to one or more of the stored thresholds.

13. The non-transitory computer readable medium as set forth in claim 9, wherein the executable code, when executed by the one or more processors, further causes the one or more processors to convert a plurality of activity logs automatically generated and stored by the enterprise application platform into the activity records, wherein the event records collectively comprise a history of state changes for each of the work items.

14. The non-transitory computer readable medium as set forth in claim 9, wherein the executable code, when executed by the one or more processors, further causes the one or more processors to send to a client device client-side code configured to, when executed by a web browser of the client device, request server-side data for one or more of the stages or process-blocks in parallel and display at least a subset of the metrics via the VSM in parallel.

15. The non-transitory computer readable medium as set forth in claim 9, wherein the executable code comprises a customizable VSM application provisioned as an add-on application within the enterprise application network, wherein execution of the customizable VSM application causes the access and transform operations to be performed.

16. The non-transitory computer readable medium as set forth in claim 15, wherein the executable code, when executed by the one or more processors, further causes the one or more processors to:

customize the customizable VSM application via a drag and drop user interface, wherein the customization operates to define the linear process, the sub-processes, and correlations of the sub-processes to states of work items in the database in response to user inputs through the drag and drop user interface.

17. An apparatus comprising memory and one or more processors, the memory comprising programmed instructions stored thereon, and wherein the one or more processors are configured to execute the stored programmed instructions to:

access a database to retrieve a sequence of changes to database records about a linear process, wherein the retrieved sequence serves as a time series of log data about the linear process, wherein the database records are generated based on user interactions with an enterprise application network as part of the linear process; and transform the time series of log data into statistical summaries of progress of work items associated with the linear process to create a visual model of the linear process, wherein the visual model comprises a value stream map (VSM); and wherein the access and transform operations include operations that:

obtain and store a mapping of status values to process-blocks within stages associated with the linear process performed on the enterprise application network, wherein the process-blocks each correspond with one of a plurality of sub-processes of the linear process;

correlate status values for the work items determined from the change records of the database with the mapping to identify one of the stages for each of the work items, wherein the change records further comprise a timestamp;

generate event records based on the correlation, activity records of the database, and another correlation of unique identifiers of the work items in the change records and the activity records, wherein each of the activity records comprises a start time and a duration of one of the sub-processes, a type of activity, and a result of the activity; and generate the VSM, wherein the VSM comprises an output display of a graphical timeline of activity associated with the linear process and real-time metrics for the process-blocks or stages, and aggregate metrics for the linear process, generated based on the event records.

18. The apparatus as set forth in claim 17, wherein the one or more processors are further configured to execute the stored programmed instructions to determine movement of one or more of the work items forward or backward with respect to the linear process based on the identified stages to:

generate one or more of speed, quality, or load metrics; or determine whether work associated with the work items is complete and accurate.

19. The apparatus as set forth in claim 17, wherein the one or more processors are further configured to execute the stored programmed instructions to:

determine a schema of the database and obtain work item records for the work items, wherein the work item records comprise characteristics associated with the work items and the schema includes at least one field that represents the work item status; and modify the VSM based on received filter criteria corresponding to one or more of the characteristics or a time at which work associated with one or more of the work items was performed.

20. The apparatus as set forth in claim 17, wherein the one or more processors are further configured to execute the stored programmed instructions to automatically generate an electronic notification when one or more stored thresholds is determined to be exceeded based on a comparison of one or more of the metrics to one or more of the stored thresholds.

21. The apparatus as set forth in claim 17, wherein the one or more processors are further configured to execute the stored programmed instructions to convert a plurality of activity logs automatically generated and stored by the enterprise application platform into the activity records, wherein the event records collectively comprise a history of state changes for each of the work items.

22. The apparatus as set forth in claim 17, wherein the one or more processors are further configured to execute the stored programmed instructions to send to a client device client-side code configured to, when executed by a web browser of the client device, request server-side data for one or more of the stages or process-blocks in parallel and display at least a subset of the metrics via the VSM in parallel.

23. The apparatus as set forth in claim 17, wherein the programmed instructions comprise a customizable VSM application provisioned as an add-on application within the enterprise application network, wherein execution of the programmed instructions causes the access and transform operations to be performed.

24. The apparatus as set forth in claim 23, wherein the one or more processors are further configured to execute the stored programmed instructions to:
  customize the customizable VSM application via a drag and drop user interface, wherein the customization operates to define the linear process, the sub-processes, and correlations of the sub-processes to states of work items in the database in response to user inputs through the drag and drop user interface.

* * * * *